(12) United States Patent
Kajisawa et al.

(10) Patent No.: US 12,466,471 B2
(45) Date of Patent: Nov. 11, 2025

(54) VEHICLE POWER SUPPLY SYSTEM AND CONTROL METHOD OF VEHICLE POWER SUPPLY SYSTEM

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Yuuta Kajisawa, Okazaki (JP); Yuji Fujita, Okazaki (JP); Yugo Nagashima, Anjo (JP); Kazuma Hasegawa, Anjo (JP); Takashi Koudai, Okazaki (JP); Kaishi Monobe, Okazaki (JP); Kenichi Abe, Okazaki (JP); Masaharu Yamashita, Toyota (JP); Shintaro Takayama, Toyota (JP); Kazuaki Iida, Toyota (JP); Yasushi Hora, Nagakute (JP); Yosuke Yamashita, Nagoya (JP); Hiroki Tomizawa, Kariya (JP); Nobuyori Nakajima, Kariya (JP); Hayaki Tanabe, Kariya (JP); Toyohiro Hayashi, Kariya (JP); Takeshi Iwana, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 123 days.

(21) Appl. No.: 18/485,710

(22) Filed: Oct. 12, 2023

(65) Prior Publication Data
US 2024/0132147 A1    Apr. 25, 2024
US 2024/0227923 A9    Jul. 11, 2024

(30) Foreign Application Priority Data
Oct. 19, 2022   (JP) ................... 2022-167633

(51) Int. Cl.
B62D 5/04   (2006.01)
H02J 9/06   (2006.01)
H02P 23/00  (2016.01)

(52) U.S. Cl.
CPC ............ B62D 5/0484 (2013.01); B62D 5/04 (2013.01); B62D 5/046 (2013.01); B62D 5/0481 (2013.01); H02J 9/06 (2013.01); H02P 23/00 (2013.01)

(58) Field of Classification Search
None
See application file for complete search history.

(56) References Cited

U.S. PATENT DOCUMENTS 7,336,002 B2 *   2/2008   Kato ................... H02J 7/1423
                                                  307/10.6
7,537,082 B2 *   5/2009   Fujiyama ............ B62D 5/0463
                                                     180/404

(Continued)

FOREIGN PATENT DOCUMENTS

EP   3745573 A1 * 12/2020 ........... B60R 16/033
EP   4169806 A1 *  4/2023 ........... B62D 5/0484

(Continued)

*Primary Examiner* — Kevin R Steckbauer
(74) *Attorney, Agent, or Firm* — Oliff PLC

(57) ABSTRACT

A vehicle power supply system includes a power source control device that executes a process of switching a connection state of a driving circuit to the main power source and an auxiliary power source including; a process of switching the connection state so as to transition to a backup state as a voltage decrease of the main power source occurs, and a process of switching the connection state so as to transition to a normal state as the voltage decrease of the main power source is resolved. After a voltage decrease of the main power source occurs, a turning-side control device of a steering control unit sets an output-limited state for a turning-side motor. The output-limited state is canceled (Continued)

upon the power source control device completing switching of the connection state so as to transition.

4 Claims, 7 Drawing Sheets

(56) References Cited

U.S. PATENT DOCUMENTS

| | | | | |
|---|---|---|---|---|
| 7,863,845 B2* | 1/2011 | Kasai | ............... | B62D 5/046 318/440 |
| 8,018,702 B2* | 9/2011 | Maeda | ............... | B60R 16/03 361/92 |
| 8,280,589 B2* | 10/2012 | Iwasaki | ............... | B62D 5/0481 180/443 |
| 8,593,084 B2* | 11/2013 | Oya | ............... | H02P 29/032 320/128 |
| 8,873,344 B2* | 10/2014 | Shimizu | ............... | G04C 10/02 368/64 |
| 8,982,379 B2* | 3/2015 | Nagami | ............... | G03G 15/5004 358/1.14 |
| 9,048,687 B2* | 6/2015 | Nakajima | ............... | H02J 7/345 |
| 9,753,821 B2* | 9/2017 | Yuasa | ............... | G06F 1/305 |
| 10,565,073 B2* | 2/2020 | Lee | ............... | G06F 1/30 |
| 11,139,679 B2* | 10/2021 | Sato | ............... | H02M 1/32 |
| 11,919,579 B2* | 3/2024 | Hasegawa | ............... | B62D 5/0406 |
| 12,145,665 B2* | 11/2024 | Satou | ............... | G01R 19/16528 |
| 12,286,171 B2* | 4/2025 | Koudai | ............... | B62D 5/0481 |
| 2006/0097577 A1* | 5/2006 | Kato | ............... | H02J 7/1423 307/10.1 |
| 2007/0169987 A1* | 7/2007 | Fujiyama | ............... | B62D 5/0484 701/41 |
| 2008/0234897 A1* | 9/2008 | Tsuchida | ............... | B62D 5/046 701/42 |
| 2009/0091193 A1* | 4/2009 | Page | ............... | H02J 9/06 307/140 |
| 2009/0140673 A1* | 6/2009 | Kasai | ............... | H02J 1/08 318/139 |
| 2009/0217062 A1* | 8/2009 | Diab | ............... | G06F 1/266 713/310 |
| 2009/0217088 A1* | 8/2009 | Diab | ............... | G06F 11/2015 714/14 |
| 2009/0316320 A1* | 12/2009 | Maeda | ............... | B60R 16/03 361/92 |
| 2011/0000736 A1* | 1/2011 | Oya | ............... | B62D 5/0457 180/443 |
| 2011/0264326 A1* | 10/2011 | Iwasaki | ............... | B62D 5/0481 701/41 |
| 2012/0057438 A1* | 3/2012 | Shimizu | ............... | G04G 19/12 368/204 |
| 2012/0253604 A1* | 10/2012 | Doray | ............... | B62D 7/1581 701/43 |
| 2013/0099573 A1* | 4/2013 | Nakajima | ............... | H02J 7/345 307/64 |
| 2013/0099759 A1* | 4/2013 | Ura | ............... | B62D 5/0481 323/234 |
| 2014/0029043 A1* | 1/2014 | Nagami | ............... | H04N 1/00888 358/1.14 |
| 2016/0033913 A1* | 2/2016 | Umimura | ............... | G03G 15/80 399/88 |
| 2018/0331566 A1* | 11/2018 | Sato | ............... | H02P 4/00 |
| 2020/0381936 A1* | 12/2020 | Sato | ............... | G01R 31/40 |
| 2022/0169304 A1* | 6/2022 | Hasegawa | ............... | B62D 5/0484 |
| 2023/0029564 A1* | 2/2023 | Satou | ............... | G01R 19/16528 |
| 2023/0088993 A1* | 3/2023 | Wu | ............... | H02J 1/082 |
| 2023/0126878 A1* | 4/2023 | Koudai | ............... | B60W 50/14 701/41 |
| 2023/0131995 A1* | 4/2023 | Koudai | ............... | B62D 5/0481 701/29.2 |
| 2024/0088814 A1* | 3/2024 | Tomizawa | ............... | H02P 29/028 |
| 2024/0132147 A1* | 4/2024 | Kajisawa | ............... | B62D 5/0481 |
| 2024/0227923 A9* | 7/2024 | Kajisawa | ............... | H02J 9/06 |
| 2024/0300571 A1* | 9/2024 | Jung | ............... | H02P 29/02 |
| 2025/0038558 A1* | 1/2025 | Hibino | ............... | H02J 7/00306 |

FOREIGN PATENT DOCUMENTS

| | | | | |
|---|---|---|---|---|
| EP | 4173868 A1 * | 5/2023 | ............ | B62D 5/0481 |
| EP | 4357219 A1 * | 4/2024 | ............ | B62D 5/04 |
| EP | 3745573 B1 * | 2/2025 | ............ | H02J 7/34 |
| JP | 2009056835 A * | 3/2009 | ............ | B62D 5/046 |
| JP | 2020-083058 A | 6/2020 | | |
| JP | 2023059527 A * | 4/2023 | ............ | B62D 5/0481 |
| JP | 2024135072 A * | 10/2024 | | |
| JP | 2024135073 A * | 10/2024 | | |
| KR | 20100125452 A * | 11/2010 | ............ | B62D 5/0463 |
| WO | WO-2009028735 A1 * | 3/2009 | ............ | B62D 5/0481 |
| WO | WO-2017006623 A1 * | 1/2017 | ............ | B62D 5/0463 |

* cited by examiner

FIG. 4

<BEFORE VOLTAGE DECREASE OF MAIN POWER SOURCE OCCURS>

| Vb | STATE CHANGE OF MAIN POWER SOURCE | POWER SUPPLY STATE | FLG |
|---|---|---|---|
| $\geq Vth$ | VOLTAGE DECREASE HAS NOT OCCURRED | NORMAL STATE | FLGnm |
| $<Vth$ | VOLTAGE DECREASE HAS OCCURRED | BACKUP STATE | FLGbu |

FIG. 5

<DURING VOLTAGE DECREASE OF MAIN POWER SOURCE>

| Vb | Tst | STATE CHANGE OF MAIN POWER SOURCE | POWER SUPPLY STATE | FLG |
|---|---|---|---|---|
| $<Vth$ | – | VOLTAGE REMAINS LOW | BACKUP STATE | FLGbu |
| $\geq Vth$ | $<Tth1$ | VOLTAGE DECREASE HAS BEEN RESOLVED | BACKUP STATE | FLGbu |
| $\geq Vth$ | $\geq Tth1$ | RECOVERED FROM VOLTAGE DECREASE | NORMAL STATE | FLGnm |
| $Ter \geq Tth2$ | | VOLTAGE REMAINS LOW | BACKUP STATE | FLGbu |
| | | WHETHER VOLTAGE DECREASE HAS BEEN RESOLVED IS NOT DETERMINED | | |

FIG. 7

<POWER SUPPLY STATE: NORMAL STATE>

| Vbps | FLGbu | STATE CHANGE OF POWER SOURCE CONTROL UNIT | Ilim |
|---|---|---|---|
| >V2 | NOT RECEIVED | NORMAL STATE | Imax |
| ≤V2 | NOT RECEIVED | TRANSITIONING TO BACKUP STATE | Imin |
| ≤V2 | RECEIVED | BACKUP STATE | Ibu |

FIG. 8

<POWER SUPPLY STATE: BACKUP STATE>

| Vbps | FLGnm | STATE CHANGE OF POWER SOURCE CONTROL UNIT | Ilim |
|---|---|---|---|
| ≤V2 | NOT RECEIVED | BACKUP STATE | Ibu |
| >V2 | NOT RECEIVED | TRANSITIONING TO NORMAL STATE | Ibu |
| >V2 | RECEIVED | NORMAL STATE | Imax |

VEHICLE POWER SUPPLY SYSTEM AND CONTROL METHOD OF VEHICLE POWER SUPPLY SYSTEM

CROSS-REFERENCE TO RELATED APPLICATION

This application claims priority to Japanese Patent Application No. 2022-167633 filed on Oct. 19, 2022, incorporated herein by reference in its entirety.

BACKGROUND

1. Technical Field

The present disclosure relates to a vehicle power supply system and a control method of a vehicle power supply system.

2. Description of Related Art

For example, a vehicle is equipped with the steering device described in Japanese Unexamined Patent Application Publication No. 2020-83058 (JP 2020-83058 A). The steering device described in JP 2020-83058 A is a so-called steer-by-wire steering device in which a power transmission path between a steering wheel of the vehicle and turning wheels of the vehicle is cut off. Electricity required in the steering device is supplied from a power source device. The power source device has a main power source and a backup power source. A state of power supply to the steering device is a state where electricity is mainly supplied from the main power source. When the main power source fails due to breakdown etc., the power supply state transitions to a backup state in which electricity is supplied from the backup power source. Thus, the backup power source backs up power supply by the main power source. The steering device is configured to set an output-limited state through an output limitation process while the power supply state is the backup state. The output limitation process is a process for limiting an output of, for example, a turning actuator that is a constituent element of the steering device.

SUMMARY

The output-limited state of JP 2020-83058 A described above is designed such that electricity required in the steering device in the backup state does not exceed the performance limit of the backup power source. Here, there is a need for measures that help prevent a situation where the output-limited state is canceled during the backup state.

A vehicle power supply system related to this disclosure includes a power source control unit having a second power source separately from a first power source installed in the vehicle, and a steering control unit that is connected to the first power source through the power source control unit and that controls a steering device installed in the vehicle. The steering control unit includes a steering control device configured to control operation of the motor. The steering control device includes a driving circuit that drives so as to supply the motor with electricity that is supplied as the driving circuit is connected to at least one of the first power source and the second power source, and the steering control device controls operation of the motor by controlling driving of the driving circuit. The power source control unit includes a power source control device that switches a connection state of the driving circuit to the first power source and the second power source. The connection state in which electricity is supplied from the first power source is referred to as a first state, the connection state in which electricity is supplied from the second power source is referred to as a second state. The power source control device is configured to execute a state detection process of detecting a state change of the first power source, and a switching process of switching the connection state of the driving circuit to the first power source and the second power source. The switching process includes: a first switching process of switching the connection state so as to transition to a second state as an abnormality of the first power source is detected through the state detection process; and a second switching process of, in the case of the second state to which the connection state has transitioned as the abnormality of the first power source has been detected, switching the connection state so as to transition to the first state as recovery of the first power source from the abnormality is detected through the state detection process. The steering control device is configured to, after the abnormality of the first power source is detected, set an output-limited state for limiting a torque that the motor is able to output compared with the torque before the abnormality is detected. The steering control device is configured to, cancel the output-limited state upon completion of the second switching process executed by the power source control device while the output-limited state is set after the abnormality of the first power source is detected.

A control method of a vehicle power supply system that can solve the above-described challenge is a method of controlling a vehicle power supply system including a power source control unit having a second power source separately from a first power source installed in the vehicle and a power source control device, and a steering control unit that is connected to the first power source through the power source control unit and that controls a steering device installed in the vehicle. The steering control unit includes a steering control device and the steering control device includes a driving circuit. This control method of a vehicle power supply system includes: by the driving circuit, supplying a motor with electricity that is supplied as the driving circuit is connected to at least one of the first power source and the second power source; by the steering control device, controlling operation of the motor by controlling driving of the driving circuit; and by the power source control device, executing following processes. The process executed by the power source control device includes: executing a state detection process of detecting a state change of the first power source; and executing a switching process of switching a connection state of the driving circuit to the first power source and the second power source. The connection state in which electricity is supplied from the first power source is referred to as a first state and the connection state in which electricity is supplied from the second power source is referred to as a second state. The switching process includes: a first switching process of switching the connection state so as to transition to the second state as an abnormality of the first power source is detected through the state detection process; and a second switching process of, in the case of the second state to which the connection state has transitioned as the abnormality of the first power source has been detected, switching the connection state so as to transition to the first state as recovery of the first power source from the abnormality is detected through the state detection process. This control method of a vehicle power supply system further includes: by the steering control device, setting an output-limited state for limiting a torque that the motor is able to output after the abnormality of the first power source is detected compared with the torque before the abnormality is detected; and by the steering control device, canceling the output-limited state upon completion of the second switching process executed by the power source control device while the output-limited state is set after the abnormality of the first power source is detected.

According to the configuration and the method described above, the power source control device is configured such that, in the case of the second state to which the connection state has transitioned as the abnormality of the first power source has been detected, the power source control device switches the connection state so as to transition to the first state as recovery of the first power source from the abnormality is detected. Here, in the case where the first state of the state of power supply to the steering device is the original state of the power supply state, the second state is a backup state. That is, in the backup state, when the power source control device detects recovery of the first power source from the abnormality, the power source control device can restore the power supply state to the original state by completing switching of the connection state from the first state to the second state. In this case, the steering control device cancels the output-limited state after the power supply state is restored to the original state. Thus, even when recovery of the first power source from the abnormality is detected, the output-limited state is maintained unless restoration of the power supply state to the original state is completed. This helps prevent a situation where the output-limited state is canceled before restoration of the power supply state to the original state is completed.

In the above-described vehicle power supply system, the state detection process may include: an abnormality condition determination process of determining whether an abnormality condition for detecting the abnormality of the first power source is met; an abnormality resolution condition determination process of determining, after the abnormality condition is met, whether an abnormality resolution condition under which the abnormality condition is not met is met; and a recovery condition determination process of determining, after the abnormality resolution condition is met, whether a recovery condition for detecting that the first power source has recovered from the abnormality is met. The abnormality condition may include a condition based on a voltage parameter indicating a voltage state of the first power source. The recovery condition may include a condition based on a state parameter indicating a state in which the abnormality condition is able to be kept unmet.

According to this configuration, in a situation where the abnormality condition is no longer met and the abnormality resolution condition is met, the power source control device can determine that the recovery condition is met on the condition that the abnormality condition being not met is not a momentary event but is maintained for some time. Thus, even when the abnormality condition is no longer met and the abnormality resolution condition is met, if it is a momentary event, recovery of the first power source from the abnormality is not detected. This can increase the accuracy in detecting recovery of the first power source from an abnormality after the abnormality of the first power source is detected.

In the above-described vehicle power supply system, the voltage parameter may be an output voltage of the first power source. The abnormality condition may include a condition based on a result of a comparison in magnitude between the output voltage and a voltage threshold value. The state parameter may be an elapsed time from when the abnormality resolution condition is met. The recovery condition may include a condition based on a result of a comparison in magnitude between the elapsed time and a time threshold value.

According to this configuration, the parameter required to determine the recovery condition can be simplified. This is effective in easily realizing a process relating to determination of the recovery condition. More specifically, in the above-described vehicle power supply system, the power source control device may be configured to execute the abnormality resolution condition determination process during a period after the abnormality condition is met until a time limit elapses while the recovery condition is not met, or the power source control device may be configured to continuously execute the abnormality resolution condition determination process while the recovery condition is not met after the abnormality condition is met.

According to the former configuration, the power source control device executes the abnormality resolution condition determination process only during the period of a time limit after the abnormality condition is met. Thus, the consumption of electricity required for the abnormality resolution condition determination process after an abnormality of the first power source is detected can be reduced. This is effective in reducing the consumption of electricity of the second power source in the case where the capacity of the second power source is limited.

According to the latter configuration, the abnormality resolution condition determination process is continuously executed while the recovery condition is not met after the abnormality condition is met, which can increase opportunities for the first power source to recover from the abnormality. This is effective in sustaining the operation of the motor as much as possible in the case where the first power source is not abnormal.

In the above-described vehicle power supply system, the power source control device and the steering control device may be communicably connected to each other through a line. Through the line, the power source control device may output to the steering control device switching completion information indicating that switching of the connection state has been completed in a case where the connection state transitions to the first state or the second state. The steering control device may recognize that switching of the connection state by the power source control device has been completed based on the switching completion information acquired from the power source control device through the line.

In the case of this configuration, the steering control device can determine the power supply state based on the information acquired from the power source control device through the line. Thus, the steering control device can operate with the power supply state taken into account.

In the above-described vehicle power supply system, the output-limited state may be a state in which a torque to be output by the motor is limited so as not to exceed an output limit value. When power source performance of the second power source defined by a power source capacity or an output voltage is low compared with power source performance of the first power source, the output limit value may be a value lower than a limit of the power source performance of the second power source.

This configuration helps prevent a situation where the power source performance of the second power source is exceeded in the backup state. Thus, even when an abnormality of the first power source is detected, operation of the motor can be appropriately continued. This is effective particularly in the case where the power source performance of the second power source is low compared with that of the first power source.

The vehicle power supply system and the control method of a vehicle power supply system of the present disclosure help prevent a situation where the output-limited state is canceled during the backup state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a table describing a process executed by a power source control device of a power source control unit of FIG. 2;

FIG. 5 is a table describing a process executed by the power source control device of the power source control unit of FIG. 2;

FIG. 7 is a table describing a process executed by a limitation control unit of FIG. 6;

FIG. 8 is a table describing a process executed by the limitation control unit of FIG. 6.

DETAILED DESCRIPTION OF EMBODIMENTS

First Embodiment

Figure 1:
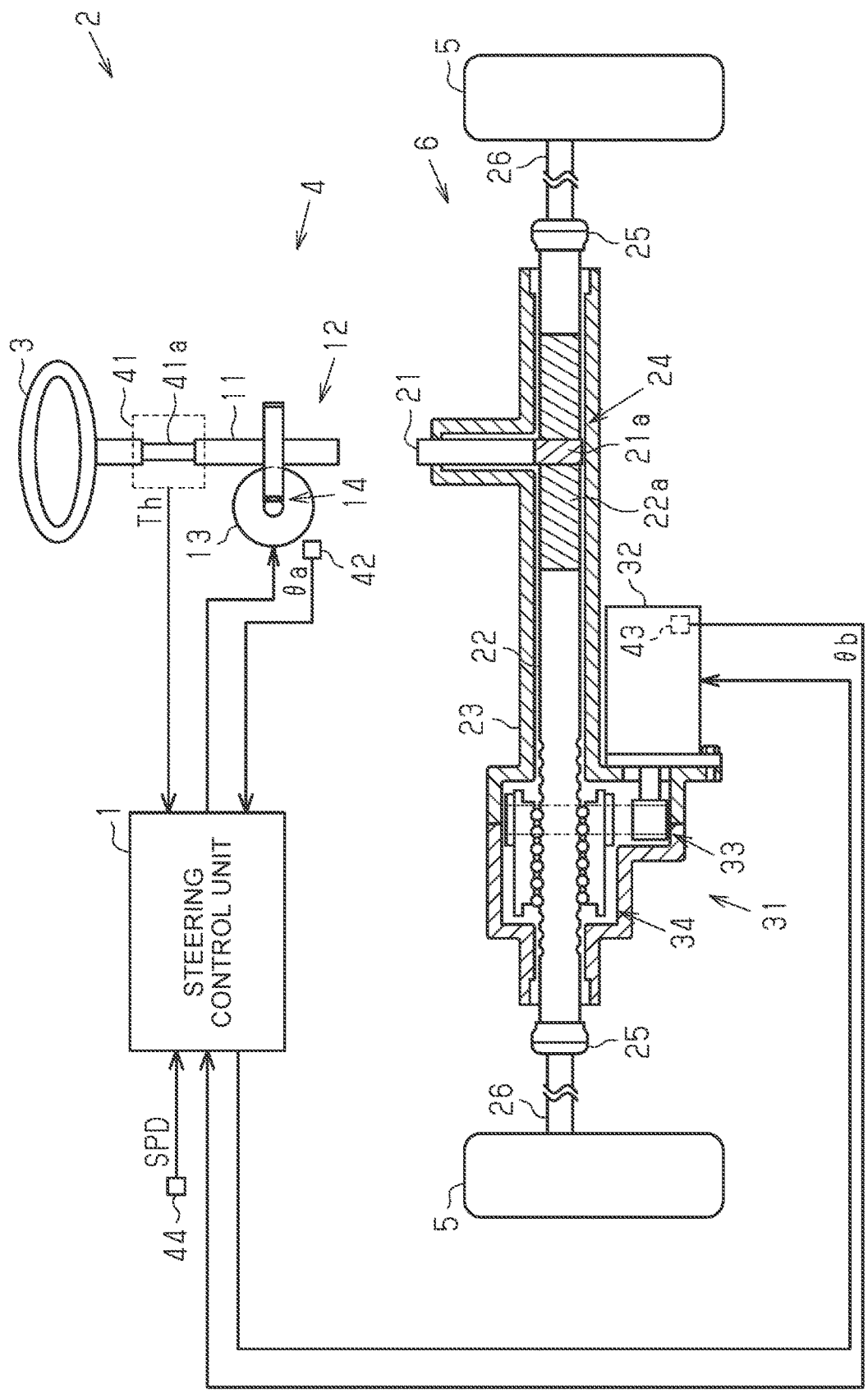
FIG. 1 is a diagram showing the configuration of a steering device according to a first embodiment.

A vehicle power supply system according to a first embodiment will be described. As shown in FIG. 1, a steering control unit 1 controls a steering device 2 as a target. The steering device 2 is configured as a steer-by-wire vehicle steering device. The steering device 2 includes a steering unit 4 and a turning unit 6. The steering unit 4 is steered by a driver through a steering wheel 3 of a vehicle that is a steering member. The turning unit 6 turns left and right turning wheels 5 of the vehicle according to steering that is input into the steering unit 4 by a driver. The steering device 2 of this embodiment has, for example, a structure in which a power transmission path between the steering unit 4 and the turning unit 6 is always mechanically cut off. In this structure, a power transmission path between a steering actuator 12, to be described later, and a turning actuator 31, to be described later, is always mechanically cut off.

The steering unit 4 includes a steering shaft 11 and the steering actuator 12. The steering shaft 11 is coupled to the steering wheel 3. The steering actuator 12 has a steering-side motor 13 and a steering-side speed reduction mechanism 14. The steering-side motor 13 is a reaction force motor that applies a steering reaction force, which is a force resisting steering, to the steering wheel 3 through the steering shaft 11. The steering-side motor 13 is coupled to the steering shaft 11 through the steering-side speed reduction mechanism 14 that is formed by, for example, a worm-and-wheel. As the steering-side motor 13 of this embodiment, for example, a three-phase brushless motor is adopted. In this embodiment, the steering-side motor 13 is one example of the driving source of the steering actuator 12.

The turning unit 6 includes a pinion shaft 21, a rack shaft 22, and a rack housing 23. The pinion shaft 21 and the rack shaft 22 are coupled together at a predetermined intersection angle. Pinion teeth 21a formed on the pinion shaft 21 and rack teeth 22a formed on the rack shaft 22 are meshed with each other to form a rack-and-pinion mechanism 24. The pinion shaft 21 corresponds to a rotating shaft of which rotation can be converted into a turning angle that is a turning position of the turning wheels 5. The rack housing 23 houses the rack-and-pinion mechanism 24. In this embodiment, the rack shaft 22 is one example of the turning shaft.

One end of the pinion shaft 21 on the opposite side from the side where it is coupled to the rack shaft 22 protrudes from the rack housing 23. Both ends of the rack shaft 22 protrude from both ends of the rack housing 23 in an axial direction. Tie rods 26 are coupled to both ends of the rack shaft 22 through rack ends 25 formed by ball joints. Leading ends of the tie rods 26 are coupled to knuckles (not shown) on which the left and right turning wheels 5 are respectively mounted.

The turning unit 6 includes the turning actuator 31. The turning actuator 31 includes a turning-side motor 32, a transmission mechanism 33, and a conversion mechanism 34. The turning-side motor 32 is a turning motor that applies a turning force for turning the turning wheels 5 to the rack shaft 22 through the transmission mechanism 33 and the conversion mechanism 34. The turning-side motor 32 transmits rotation to the conversion mechanism 34 through the transmission mechanism 33 that is formed by, for example, a belt transmission mechanism. The transmission mechanism 33 converts rotation of the turning-side motor 32 into reciprocating motion of the rack shaft 22 through the conversion mechanism 34 that is formed by, for example, a ball screw mechanism. As the turning-side motor 32 of this embodiment, for example, a three-phase brushless motor is adopted. In this embodiment, the turning-side motor 32 is one example of the motor, i.e., the driving source of the turning actuator 31.

In the steering device 2, the turning angle of the turning wheels 5 is changed as a motor torque is applied as a turning force from the turning actuator 31 to the rack shaft 22 according to the driver's steering operation. Meanwhile, a steering reaction force resisting the driver's steering is applied form the steering actuator 12 to the steering wheel 3. Thus, in the steering device 2, a steering torque Th required to steer the steering wheel 3 is changed by the steering reaction force that is a motor torque applied from the steering actuator 12.

The reason for providing the pinion shaft 21 is to support the rack shaft 22 along with the pinion shaft 21 inside the rack housing 23. By a support mechanism (not shown) provided in the steering device 2, the rack shaft 22 is supported so as to be movable along its axial direction and is pressed toward the pinion shaft 21. Thus, the rack shaft 22 is supported inside the rack housing 23. However, another support mechanism may be provided that supports the rack shaft 22 on the rack housing 23 without using the pinion shaft 21.

Electrical Configuration of Steering Device

As shown in FIG. 1, the steering-side motor 13 and the turning-side motor 32 are connected to the steering control unit 1. The steering control unit 1 controls operation of each of the motors 13, 32.

Detection results of various sensors are input into the steering control unit 1. Examples of the various sensors include a torque sensor 41, a steering-side rotation angle sensor 42, a turning-side rotation angle sensor 43, and a vehicle speed sensor 44.

The torque sensor 41 is provided on the steering shaft 11, at a part between the steering wheel 3 and the steering-side speed reduction mechanism 14. The torque sensor 41 detects the steering torque Th that is a value indicating a torque applied to the steering shaft 11 by the driver's steering operation. The steering torque Th is detected in relation to twisting of a torsion bar 41a that is provided at an intermediate part of the steering shaft 11, between the steering wheel 3 and the steering-side speed reduction mechanism 14 in the steering shaft 11. The steering-side rotation angle sensor 42 is provided on the steering-side motor 13. The steering-side rotation angle sensor 42 detects a rotation angle θa that is an angle of a rotating shaft of the steering-side motor 13 within a range of 360 degrees. The turning-side rotation angle sensor 43 is provided on the turning-side motor 32. The turning-side rotation angle sensor 43 detects a rotation angle θb that is an angle of a rotating shaft of the turning-side motor 32 within a range of 360 degrees. The vehicle speed sensor 44 detects a vehicle speed SPD that is a traveling speed of the vehicle.

Electrical Configuration of Steering Control Unit

Figure 2:
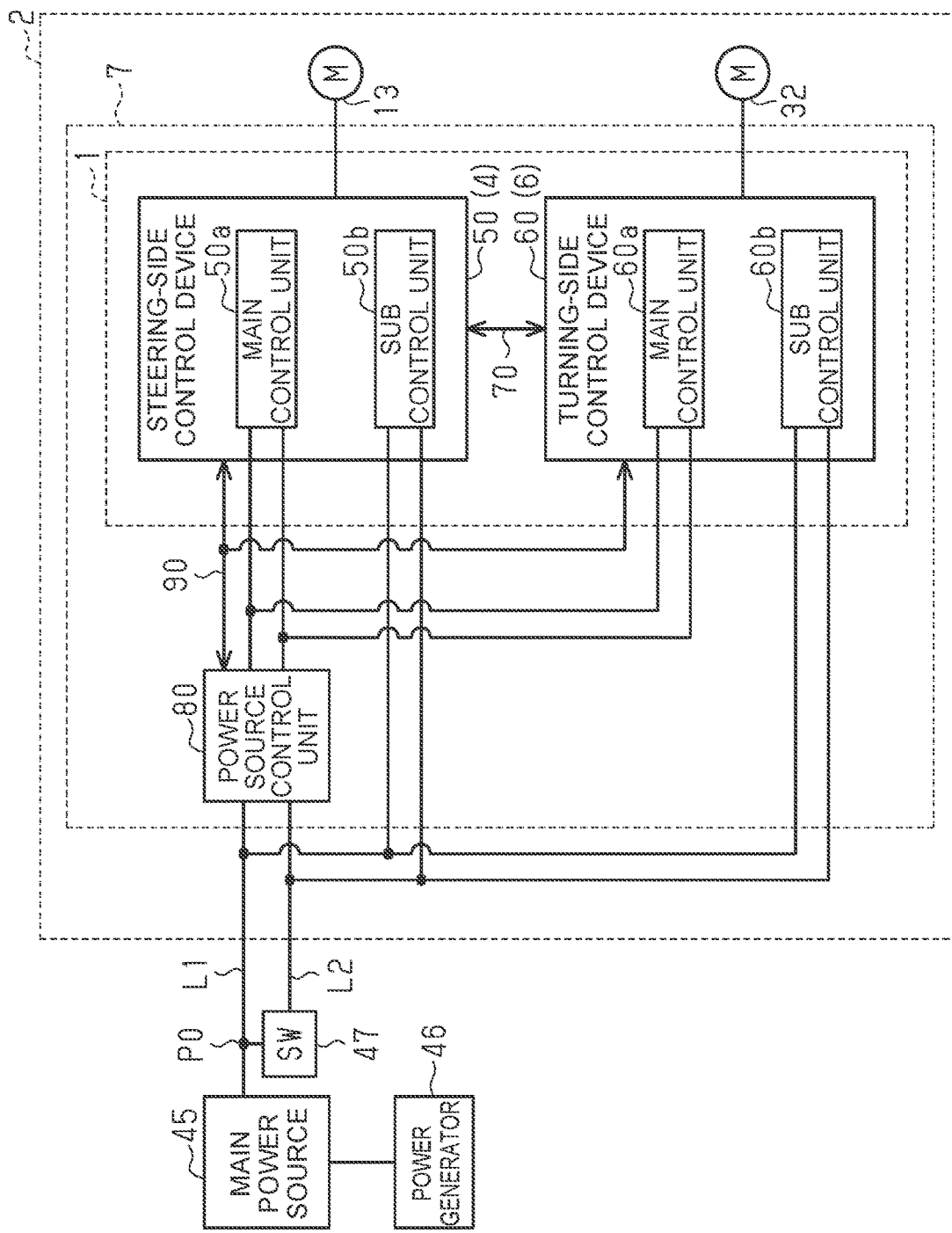
FIG. 2 is a diagram showing the configuration of a vehicle power supply system according to the first embodiment.

As shown in FIG. 2, the steering control unit 1 has a steering-side control device 50 and a turning-side control device 60. The steering-side control device 50 controls power supply to the steering-side motor 13. The turning-side control device 60 controls power supply to the turning-side motor 32. The steering-side control device 50 and the turning-side control device 60 transmit and receive information to and from each other through a local network 70, such as serial communication. The steering-side control device 50 constitutes a part of the steering unit 4. The turning-side control device 60 constitutes a part of the turning unit 6.

The steering-side control device 50 includes a central processing unit (CPU) and a memory (neither of which is shown), and the CPU executes a program stored in the memory on a predetermined arithmetic operation cycle. The CPU and the memory constitute a microcomputer that is a processing circuit. Similarly, the turning-side control device 60 includes a central processing unit (CPU) and a memory (neither of which is shown), and the CPU executes a program stored in the memory on a predetermined arithmetic operation cycle. The CPU and the memory constitute a microcomputer that is a processing circuit. The memory includes a computer-readable medium, such as a random-access memory (RAM) and a read-only memory (ROM). However, that various processes are realized by software is one example. The processing circuit that the steering-side control device 50 has may be configured such that at least some of the processes are realized by a hardware circuit, such as a logic circuit. The same applies to the turning-side control device 60.

The arithmetic operation cycle of the steering-side control device 50 is set based on an arithmetic operation cycle of a power source control device 88, to be described later, or a communication cycle of a signal line 90, to be described later, that is a dedicated line. For example, the arithmetic operation cycle of the steering-side control device 50 is short compared with the arithmetic operation cycle of the power source control device 88, to be described later, or the communication cycle of the dedicated signal line 90 to be described later.

The steering-side control device 50 has dual control systems each formed by a combination of a CPU and a memory to execute various processes. The dual control systems include a system formed by a main control unit 50a and a system formed by a sub control unit 50b. The same applies to the turning-side control device 60. That is, the turning-side control device 60 has dual control systems each formed by a combination of a CPU and a memory to execute various processes. The dual control systems include a system formed by a main control unit 60a and a system formed by a sub control unit 60b. The steering-side control device 50 and the turning-side control device 60 are configured to be communicable through the local network 70.

The steering-side control device 50 calculates a reaction force control amount based on various pieces of information. Examples of the various pieces of information include detection results of the above-described various sensors and information that is obtained from the turning-side control device 60 through the local network 70. The reaction force control amount is a target value of the steering reaction force of the steering wheel 3 that should be generated through the steering-side motor 13. The steering-side control device 50 controls power supply to the steering-side motor 13 based on this reaction force control amount. The turning-side control device 60 calculates a turning control amount based on various pieces of information. Examples of the various pieces of information include detection results of the above-described various sensors and information that is obtained from the steering-side control device 50 through the local network 70. The turning control amount is a target value of a turning force that should be generated through the turning-side motor 32. The turning-side control device 60 controls power supply to the turning-side motor 32 based on this turning control amount.

Paths of Power Supply to Steering Device

The steering device 2 has a power source control unit 80. The power source control unit 80 is connected to a main power source 45. The steering control unit 1 is connected to the main power source 45 through the power source control unit 80. The main power source 45 is, for example, a secondary battery that is a direct-current power source installed in the vehicle. The main power source 45 is a supply source of electricity required for operation of, for example, the steering control unit 1, the motors 13, 32, and the power source control unit 80 that are constituent elements of the steering device 2. Thus, the steering control unit 1, the motors 13, 32, the power source control unit 80, etc. operate by consuming electricity of the main power source 45. The main power source 45 is connected to a power generator 46 that is an alternator or the like. The power generator 46 generates alternating-current power using, as a motive power source, rotation of an engine that is a travel driving source of the vehicle. The alternating-current power generated by the power generator 46 is converted into direct-current power and stored in the main power source 45. In this embodiment, the main power source 45 is one example of the first power source.

The power source control unit 80 is connected to the main power source 45 through two power supply lines L1, L2. The power supply line L2 branches off from a connection point P0 of the power supply line L1. In the power supply line L2, a start switch 47 is provided. The start switch 47 is, for example, an ignition switch or a power switch. The start switch 47 is operated to start or stop the travel driving source of the vehicle. Operation of the start switch 47 is a trigger for switching between on and off of conduction of the power supply line L2. Conduction of the power supply line L1 is basically always on. However, the steering device 2 has a configuration for internally turning conduction of the power supply line L1 on and off in conjunction with operation of the start switch 47. Thus, a state of power supply to the steering device 2 is linked to operation of the start switch 47, i.e., an operating state of the travel driving source of the vehicle.

The main control unit 50*a* is connected to the power supply lines L1, L2 through the power source control unit 80. Thus, the main control unit 50*a* is connected to the main power source 45 through the power source control unit 80 and the power supply lines L1, L2. The same applies to the main control unit 60*a*. The main control unit 60*a* is connected to the power supply lines L1, L2 through the power source control unit 80. Thus, the main control unit 60*a* is connected to the main power source 45 through the power source control unit 80 and the power supply lines L1, L2.

The sub control unit 50*b* is directly connected to the power supply lines L1, L2 without the power source control unit 80 interposed. Thus, the sub control unit 50*b* is connected to the main power source 45 without the power source control unit 80 interposed. The same applies to the sub control unit 60*b*. The sub control unit 60*b* is directly connected to the power supply lines L1, L2 without the power source control unit 80 interposed. Thus, the sub control unit 60*b* is connected to the main power source 45 without the power source control unit 80 interposed. In this embodiment, the steering-side control device 50 and the turning-side control device 60 share the single power source control unit 80. The power source control unit 80 can communicate with the steering-side control device 50 through the signal line 90. The power source control unit 80 can communicate with the turning-side control device 60 through the signal line 90.

Figure 3:
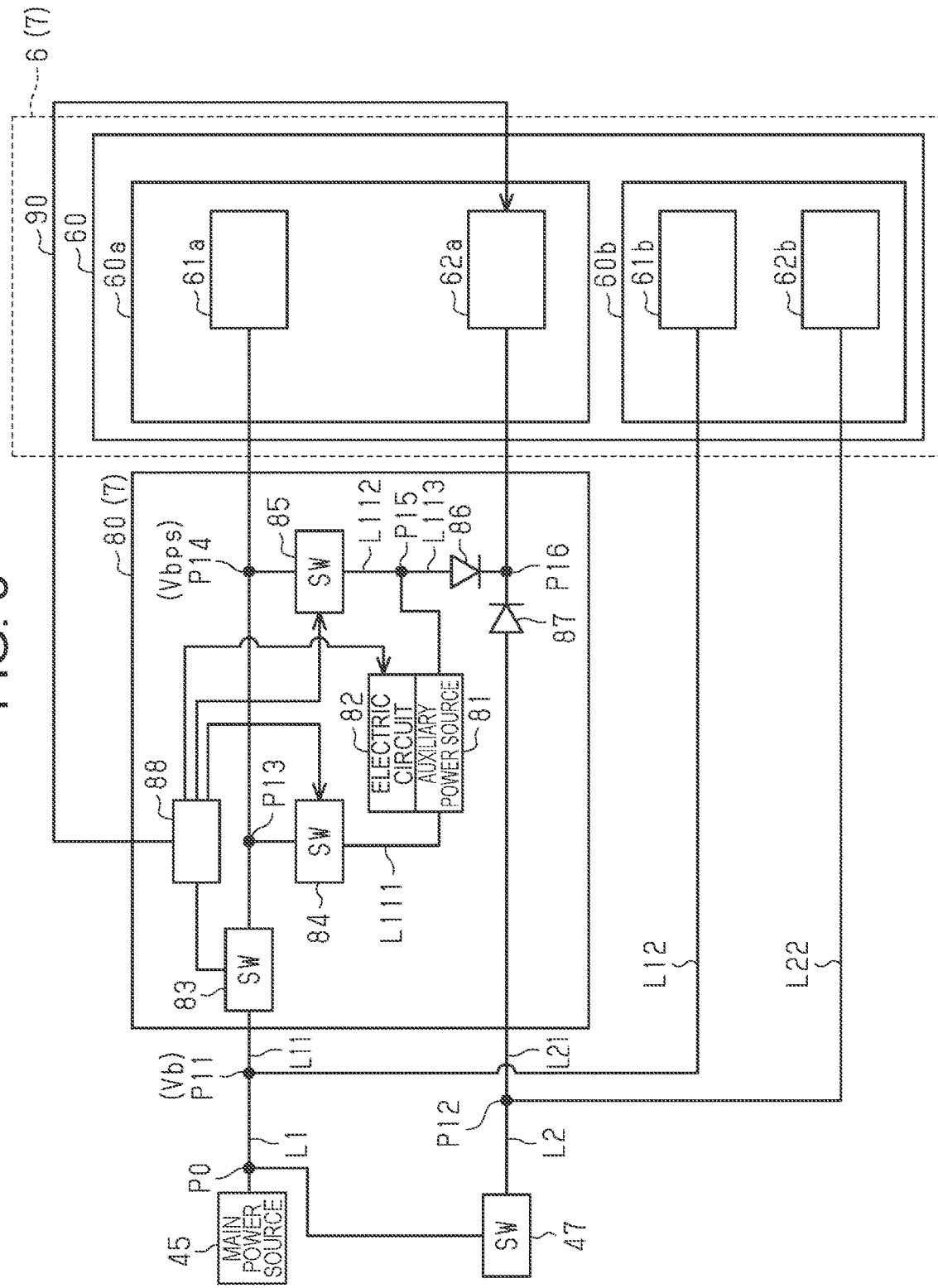
FIG. 3 is a block diagram showing the electrical configuration of the vehicle power supply system of FIG. 2.

FIG. 3 shows the configuration of power supply paths in detail. Here, description will be focused on a configuration relating to the turning-side control device 60. A configuration relating to the steering-side control device 50 is basically the same as the configuration relating to the turning-side control device 60.

As shown in FIG. 3, the main control unit 60*a* has a driving circuit 61*a* and a control circuit 62*a*. The sub control unit 60*b* has a driving circuit 61*b* and a control circuit 62*b*. The driving circuits 61*a*, 61*b* are circuits that handle larger amounts of electricity, and include, for example, an inverter that converts the direct-current power of the main power source 45 into alternating-current power. The control circuits 62*a*, 62*b* are circuits for controlling the steering-side motor 13, and include, for example, a CPU and a memory.

Electricity of the main power source 45 is supplied to the driving circuit 61*a* through a power supply line L11 that branches off from a connection point P11 of the power supply line L1. Electricity of the main power source 45 is supplied to the control circuit 62*a* through a power supply line L21 that branches off from a connection point P12 of the power supply line L2. Electricity of the main power source 45 is supplied to the driving circuit 61*b* through a power supply line L12 that branches off from the connection point P11 of the power supply line L1. Electricity of the main power source 45 is supplied to the control circuit 62*b* of the sub control unit 60*b* through a power supply line L22 that branches off from the connection point P12 of the power supply line L2.

The steering-side control device 50 has a configuration corresponding to that of the turning-side control device 60. That is, the main control unit 50*a* has a configuration corresponding to that of the driving circuit 61*a* and the control circuit 62*a*. The sub control unit 50*b* has a configuration corresponding to that of the driving circuit 61*b* and the control circuit 62*b*.

Configuration of Power Source Control Unit

As shown in FIG. 3, the power source control unit 80 has an auxiliary power source 81, an electric circuit 82, switches 83, 84, 85, diodes 86, 87, and the power source control device 88.

The auxiliary power source 81 is, for example, a capacitor having a function similar to that of a secondary battery. The auxiliary power source 81 is a supply source of electricity required for operation of, for example, the steering control unit 1 and the motors 13, 32 that are constituent elements of the steering device 2. The auxiliary power source 81 supplies electricity to the main control units 50*a*, 60*a*, the motors 13, 32, the power source control device 88, etc. among constituent elements to which the main power source 45 supplies electricity. Thus, the main control units 50*a*, 60*a*, the motors 13, 32, the power source control device 88, etc. can operate by consuming not only electricity of the main power source 45 but also electricity of the auxiliary power source 81.

The auxiliary power source 81 is connected to the connection point P11 of the power supply line L11 through a power supply line L111 that branches off from a connection point P13 of the power supply line L11. The auxiliary power source 81 is connected to the connection point P11 of the power supply line L11 through a power supply line L112 that branches off from a connection point P14 of the power supply line L11. The connection point P14 is a connection point located on a downstream side, more specifically on the side closer to the turning-side control device 60, in the power supply line L11 relative to the connection point P13.

In this embodiment, the state of power supply to the steering device 2 is a state where electricity is supplied mainly from the main power source 45. When the main power source 45 fails due to breakdown etc., the power supply state transitions to a backup state in which electricity is supplied from the auxiliary power source 81. Thus, the auxiliary power source 81 backs up power supply by the main power source 45. The auxiliary power source 81 backs up power supply to some of the constituent elements to which the main power source 45 supplies electricity, such as the main control units 50*a*, 60*a*, the motors 13, 32, and the power source control device 88, as targets.

The power source performance, defined by, for example, the power source capacity and the output voltage, of the auxiliary power source 81 of this embodiment is low compared with that of the main power source 45. That is, the power source capacity, representing the amount of charge, of the auxiliary power source 81 is small compared with that of the main power source 45. The output voltage, representing the magnitude of supply power, of the auxiliary power source 81 is low compared with that of the main power source 45. In this embodiment, the auxiliary power source 81 is one example of the second power source.

As represented by Expression (A) below, an output voltage V2 of the auxiliary power source 81 is set to a value that is higher than a voltage V0 required to appropriately operate the motors 13, 32, the control devices 50, 60, etc. and lower than an output voltage V1 of the main power source 45.

$$V1 > V2 > V0 \quad (A)$$

Failure of the main power source 45 is detected on the condition of an actual decrease in an output voltage Vb of the main power source 45. The output voltage Vb is a voltage parameter indicating a voltage state of the main power source 45. A decrease in the output voltage Vb indicates that the main power source 45 is in a state of being unable to maintain the output voltage V1.

A power source capacity C2 of the auxiliary power source 81 is set to a value that is larger than a power source capacity C0 required to safely continue appropriate operation of the motors 13, 32, the control devices 50, 60, etc. and smaller than a power source capacity C1 of the main power source 45.

The electric circuit 82 switches a connection state of the auxiliary power source 81 to the power supply line L11 such that the auxiliary power source 81 assumes a charging, discharging, or on-hold state. For example, when putting the auxiliary power source 81 in the on-hold state, the electric circuit 82 switches the connection state to the power supply line L11 so as to cut off the auxiliary power source 81.

The switch 83 is provided at an intermediate point of the power supply line L11. The switch 83 is a switch located on an upstream, more specifically on the side closer to the main power source 45, relative to the connection point P13. The switch 83 turns conduction of the power supply line L11 on and off. The switch 84 is provided at an intermediate point of the power supply line L111. The switch 84 turns conduction of the power supply line L111 on and off. The switch 85 is provided at an intermediate point of the power supply line L112. The switch 85 turns conduction of the power supply line L112 on and off.

In the power supply line L112, a connection point P15 is set. The connection point P15 of the power supply line L112 and a connection point P16 of the power supply line L21 are connected to each other by a power supply line L113. The diode 86 is provided at an intermediate point of the power supply line L113. A cathode of the diode 86 is connected to the connection point P16 of the power supply line L21. An anode of the diode 86 is connected to the connection point P15 of the power supply line L112.

The diode 87 is provided at an intermediate point of the power supply line L21. A cathode of the diode 87 is connected to the connection point P16 of the power supply line L21. An anode of the diode 87 is connected to the connection point P12 of the power supply line L21.

The diodes 86, 87 allow a flow of electricity from the anode toward the cathode while restricting a flow of electricity from the cathode toward the anode. The diodes 86, 87 form an OR circuit that supplies the control circuit 62a with one of electricity of the main power source 45 and electricity of the auxiliary power source 81 that has a higher voltage. The OR circuit formed by the diodes 86, 87 is a so-called wired OR. The OR circuit formed by the diodes 86, 87 corresponds to a selection circuit that selects one of electricity of the main power source 45 and electricity of the auxiliary power source 81 that has a higher supply voltage to supply electricity to the turning-side control device 60. In this embodiment, the OR circuit is one example of the connection circuit.

Function of Power Source Control Device

The power source control device 88 includes a central processing unit (CPU) and a memory (neither of which is shown), and the CPU executes a program stored in the memory on a predetermined arithmetic operation cycle. The CPU and the memory constitute a microcomputer that is a processing circuit. The memory includes a computer-readable medium, such as a random-access memory (RAM) and a read-only memory (ROM). However, that various processes are realized by software is one example. The processing circuit that the power source control device 88 has may be configured such that at least some of the processes are realized by a hardware circuit, such as a logic circuit.

More specifically, the power source control device 88 controls switching of a connection state of the electric circuit 82, and controls opening and closing of the switches 83, 84, 85. The power source control device 88 monitors the voltage of the main power source 45. The power source control device 88 detects the voltage of electricity supplied to the power source control unit 80 through the power supply line L11 as the output voltage Vb of the main power source 45. The output voltage Vb is a voltage detected at the connection point P11 of the power supply line L11.

When the output voltage Vb of the main power source 45 is lower than a voltage threshold value Vth as represented by Expression (B) below, the power source control device 88 determines that the output voltage Vb of the main power source 45 has decreased. The voltage threshold value Vth is a criterion for determining a voltage decrease of the main power source 45, and is set based on the voltage V0 that is required to appropriately operate the motors 13, 32 or the control devices 50, 60. In this embodiment, the voltage threshold value Vth is set to the same value as the voltage V0:

$$Vb < Vth \quad (B)$$

When a voltage decrease of the main power source 45 is not detected, the power source control device 88 keeps the switches 83, 84 in a closed state of being on and keeps the switch 85 in an open state of being off. When a voltage decrease of the main power source 45 is detected, the power source control device 88 switches the switches 83, 84 from the closed state of being on to the open state of being off. Thereafter, the power source control device 88 switches the switch 85 from the open state of being off to the closed state of being on.

More specifically, when the output voltage Vb of the main power source 45 has not decreased, the switches 83, 84 are kept in the closed state of being on while the switch 85 is kept in the open state of being off. For example, for the turning unit 6, electricity from the main power source 45 is supplied to the driving circuit 61a through the power supply line L11. Electricity from the main power source 45 is charged to the auxiliary power source 81 through the power supply line L111.

In the case where the output voltage Vb has not decreased, when the start switch 47 is turned on, electricity of the main power source 45 is supplied to the control circuit 62a through the power supply line L21. The output voltage Vb is set to the output voltage V1 that is higher than the output voltage V2, so that electricity of the auxiliary power source 81 is basically not supplied to the control circuit 62a through the power supply line L113 and part of the power supply line L21. The diode 86 restricts electricity of the main power source 45 having flowed through the power supply line L21 from flowing into the auxiliary power source 81 through the power supply line L113.

When the main power source 45 fails and the output voltage Vb falls below the output voltage V2, electricity from the auxiliary power source 81 is immediately supplied to the control circuit 62a through the power supply line L113 and part of the power supply line L21. This is because the output voltage V2 becomes higher than a voltage occurring in the power supply line L2. Even when power supply from the main power source 45 to the control circuit 62a is interrupted as the main power source 45 fails, power supply to the control circuit 62a is backed up by the auxiliary power source 81.

When the output voltage Vb decreases further and the output voltage Vb falls below the voltage threshold value Vth, the switches 83, 84 are switched from the closed state of being on to the open state of being off. Thereafter, the switch 85 is switched from the open state of being off to the closed state of being on. As a result, electricity of the auxiliary power source 81 is supplied to the driving circuit 61a through the power supply line L112 and part of the power supply line L11. This is because, as the main power source 45 fails, the output voltage V2 becomes higher than a voltage occurring in the power supply line L11. Thus, even when power supply from the main power source 45 to the driving circuit 61a is interrupted as the output voltage Vb falls below the voltage threshold value Vth, power supply to the driving circuit 61a is backed up by the auxiliary power source 81.

When the output voltage Vb falls below the voltage threshold value Vth and then becomes equal to or higher than the voltage threshold value Vth, the switch 85 is switched from the closed state of being on to the open state of being off. Thereafter, the switches 83, 84 are switched from the open state of being off to the closed state of being on. As a result, electricity of the main power source 45 is supplied to the driving circuit 61a through the power supply line L11. It is not that electricity from the main power source 45 is immediately supplied to the control circuit 62a through the power supply line L113 and part of the power supply line L21. This is because the output voltage V2 becomes higher than a voltage occurring in the power supply line L2 until the output voltage Vb that has become equal to or higher than the voltage threshold value Vth further exceeds the output voltage V2. Therefore, when power supply to the driving circuit 61a is restored as a result of recovery from the state where the output voltage Vb is below the voltage threshold value Vth, power supply from the main power source 45 to the driving circuit 61a is restored.

It is conceivable to provide a diode, instead of the switch 85, in the power supply line L112. Then, when the main power source 45 fails, electricity of the auxiliary power source 81 is immediately supplied to the driving circuit 61a. However, a power loss occurs in the diode. Therefore, from the viewpoint of reducing consumption of the auxiliary power source 81, the switch 85, and not a diode, is provided in the power supply line L112 for supplying electricity to the driving circuit 61a that requires a larger amount of electricity.

It is also conceivable to provide a switch, instead of the diode 86, in the power supply line L113. However, doing so raises the following concern. That is, it takes a time, albeit short, for the switch in the power supply line L113 to switch from off to on after power supply from the main power source 45 is interrupted due to failure of the main power source 45. Thus, during the period until the switch in the power supply line L113 switches from off to on, power supply to the control circuit 62a is momentarily interrupted, which may cause the control circuit 62a to be reset. In this respect, when the diode 86 is provided in the power supply line L113, in the event of failure of the main power source 45, electricity of the auxiliary power source 81 is immediately supplied to the control circuit 62a through the power supply line L113 and part of the power supply line L21. Since power supply to the control circuit 62a is not interrupted, the control circuit 62a is not reset, either.

Monitoring by Power Source Control Device

The power source control device 88 monitors state changes of the main power source 45 through detection of the output voltage Vb. Thus, the power source control device 88 switches the connection state of the driving circuit 61a to the main power source 45 and the auxiliary power source 81 according to state changes of the main power source 45. State changes of the main power source 45 are determined based on a detection result of the output voltage Vb. When the power source control device 88 detects that the output voltage Vb is equal to or higher than the voltage threshold value Vth, the power source control device 88 determines that a voltage decrease of the main power source 45 has not occurred, i.e., the main power source 45 is normal. When the power source control device 88 detects that the output voltage Vb is below the voltage threshold value Vth, the power source control device 88 determines that the voltage of the main power source 45 is low, i.e., the main power source 45 is abnormal. In this embodiment, whether the voltage of the main power source 45 is low is determined based on whether power supply from the main power source 45 to the driving circuit 61a is possible. That is, even when the main power source 45 fails, the power source control device 88 determines that a voltage decrease of the main power source 45 has not occurred if the output voltage Vb is equal to or higher than the voltage threshold value Vth. In this embodiment, the process of the power source control device 88 for monitoring state changes of the main power source 45 by detecting the output voltage Vb is one example of the state detection process. The process of the power source control device 88 for switching the connection state of the driving circuit 61a to the main power source 45 and the auxiliary power source 81 according to state changes of the main power source 45 is one example of the switching process.

More specifically, FIG. 4 shows a state change of the main power source 45 from a state where the output voltage Vb is equal to or higher than the voltage threshold value Vth. The power source control device 88 determines that a voltage decrease of the main power source 45 has not occurred. The connection state is a connection state in which the switches 83, 84 are in the closed state of being on and the switch 85 is in the open state of being off, and in which electricity is supplied from the main power source 45 to the driving circuit 61a.

As shown in FIG. 4, when it is detected that the output voltage Vb is equal to or higher than the voltage threshold value Vth, the power source control device 88 maintains the determination that a voltage decrease of the main power source 45 has not occurred. The power source control device 88 maintains the connection state in which the switches 83, 84 are in the closed state of being on and the switch 85 is in the open state of being off. The connection state is a normal state which is an original state of the state of power supply to the steering device 2 and in which electricity is supplied from the main power source 45 to the driving circuit 61a. In this embodiment, the connection state in which electricity is supplied from the main power source 45 to the driving circuit 61a is one example of the first state.

As shown in FIG. 4, when it is detected that the output voltage Vb is below the voltage threshold value Vth, the power source control device 88 determines that a voltage decrease of the main power source 45 has occurred. The power source control device 88 switches the connection state to the connection state in which the switches 83, 84 are in the open state of being off and the switch 85 is in the closed state of being on. The connection state is a backup state of the state of power supply to the steering device 2 in which electricity is supplied from the auxiliary power source 81 to the driving circuit 61*a*. In this embodiment, the connection state in which electricity is supplied from the auxiliary power source 81 to the driving circuit 61*a* is one example of the second state. That the output voltage Vb is below the voltage threshold value Vth is one example of meeting an abnormality condition. The process of the power source control device 88 for determining that a voltage decrease of the main power source 45 has occurred or not occurred by detecting the output voltage Vb is one example of the abnormality condition determination process.

FIG. 5 shows state changes of the main power source 45 from the state where the output voltage Vb is below the voltage threshold value Vth. The power source control device 88 determines that the voltage of the main power source 45 is low. The connection state is a connection state in which the switches 83, 84 are in the open state of being off and the switch 85 is in the closed state of being on and in which electricity is supplied from the auxiliary power source 81 to the driving circuit 61*a*.

As shown in FIG. 5, when it is detected that the output voltage Vb is below the voltage threshold value Vth, the power source control device 88 maintains the determination that the voltage of the main power source 45 is low. The power source control device 88 maintains the connection state in which the switches 83, 84 are in the open state of being off and the switch 85 is in the closed state of being on. That is, the power source control device 88 maintains the backup state as the power supply state.

As shown in FIG. 5, when it is detected that the output voltage Vb is equal to or higher than the voltage threshold value Vth, the power source control device 88 determines that the voltage decrease of the main power source 45 has been resolved. At the same time, the power source control device 88 determines a state where the detection of the output voltage Vb equal to or higher than the voltage threshold value Vth is maintained. In this embodiment, that the output voltage Vb is equal to or higher than the voltage threshold value Vth as a state change of the main power source 45 from the state where the output voltage Vb is below the voltage threshold value Vth is one example of meeting an abnormality resolution condition under which the abnormality condition is not met. The process of the power source control device 88 for determining that the voltage decrease of the main power source 45 has been resolved by detecting the output voltage Vb is one example of the abnormality resolution condition determination process.

When the power source control device 88 determines that the voltage decrease of the main power source 45 has been resolved, and moreover a determination time Tst has not reached a time threshold value Tth1, the power source control device 88 does not determine that the main power source 45 has recovered from the voltage decrease. The determination time Tst is a time for which the power source control device 88 maintains the detection of the output voltage Vb equal to or higher than the voltage threshold value Vth. The time threshold value Tth1 is a value within a range that is experimentally obtained such that detection of the output voltage Vb equal to or higher than the voltage threshold value Vth is not a momentary event. The power source control device 88 maintains the connection state in which the switches 83, 84 are in the open state of being off and the switch 85 is in the closed state of being on. Thus, even when the power source control device 88 determines that the voltage decrease of the main power source 45 has been resolved, the power source control device 88 maintains the backup state as the power supply state until the determination time Tst reaches the time threshold value Tth1.

On the other hand, when the power source control device 88 determines that the voltage decrease of the main power source 45 has been resolved, and moreover the determination time Tst has reached the time threshold value Tth1, the power source control device 88 determines that the main power source 45 has recovered from the voltage decrease, i.e., the backup state is to be canceled. The power source control device 88 switches the connection state to the connection state in which the switches 83, 84 are in the closed state of being on and the switch 85 is in the open state of being off. Thus, the power source control device 88 restores the power supply state from the backup state to the normal state after the determination time Tst from determining that the voltage decrease of the main power source 45 has been resolved reaches the time threshold value Tth1.

In this embodiment, the determination time Tst is one example of the state parameter indicating a state in which resolution of the voltage decrease of the main power source 45 can be maintained. That the determination time Tst reaches the time threshold value Tth1 after it is determined that the voltage decrease of the main power source 45 has been resolved is one example of the recovery condition. The process of the power source control device 88 for determining whether the determination time Tst has reached the time threshold value Tth1 and thereby determining the state where the detection of the output voltage Vb equal to or higher than the voltage threshold value Vth is maintained is one example of the recovery condition determination process.

As shown in FIG. 5, after an elapsed time Ter from when the state where the output voltage Vb is below the voltage threshold value Vth arises reaches a time limit Tth2, the power source control device 88 does not execute the process for determining whether the voltage decrease has been resolved. The elapsed time Ter is a time for which the power source control device 88 maintains the detection of the output voltage Vb below the voltage threshold value Vth. The time limit Tth2 is a value larger than the time threshold value Tth1 from the viewpoint of not preventing electricity that the auxiliary power source 81 can supply to the turning-side motor 32. The power source control device 88 maintains the connection state in which the switches 83, 84 are in the open state of being off and the switch 85 is in the closed state of being on. Thus, after the elapsed time Ter from occurrence of the voltage decrease of the main power source 45 reaches the time limit Tth2, the power source control device 88 determines that the voltage of the main power source 45 is low and maintains the backup state as the power supply state.

When switching the connection state of the driving circuit 61*a* to the main power source 45 and the auxiliary power source 81 according to state changes of the main power source 45, the power source control device 88 generates a power supply state signal FLG indicating a power supply state upon completion of the switching.

More specifically, as shown in FIG. 4, the power source control device 88 generates a power supply state signal FLGnm while the power source control device 88 is determining that a voltage decrease of the main power source 45 has not occurred. When the power source control device 88 determines that a voltage decrease of the main power source 45 has occurred, the power source control device 88 generates a power supply state signal FLGbu upon completion of switching of the switches 83, 84, 85 to the backup state. The power supply state signal FLGbu in this case corresponds to switching completion information indicating completion of switching of the switches 83, 84, 85 to the backup state.

Further, as shown in FIG. 5, the power source control device 88 generates the power supply state signal FLGbu while the power source control device 88 is determining that the voltage of the main power source 45 remains low. When the power source control device 88 determines that the voltage decrease of the main power source 45 has been resolved, the power source control device 88 generates the power supply state signal FLGnm upon completion of switching of the switches 83, 84, 85 to the normal state. The power supply state signal FLGnm in this case corresponds to switching completion information indicating completion of switching of the switches 83, 84, 85 to the normal state.

When the power source control device 88 generates the power supply state signal FLG, the power source control device 88 outputs the generated signal to the signal line 90. The power supply state signal FLG thus output is transmitted through the signal line 90 to the turning-side control device 60, i.e., the main control unit 60a. While the power source control device 88 is determining that the voltage of the main power source 45 remains low, the power source control device 88 continuously outputs the power supply state signal FLGbu. While the power source control device 88 is detecting that a voltage decrease of the main power source 45 has not occurred, the power source control device 88 continuously outputs the power supply state signal FLGnm. By receiving the power supply state signal FLG, the main control unit 60a recognizes the connection state of the driving circuit 61a to the main power source 45 and the auxiliary power source 81, i.e., whether the power supply state is the normal state or the backup state.

Function of Main Control Unit of Turning-Side Control Device

Figure 6:
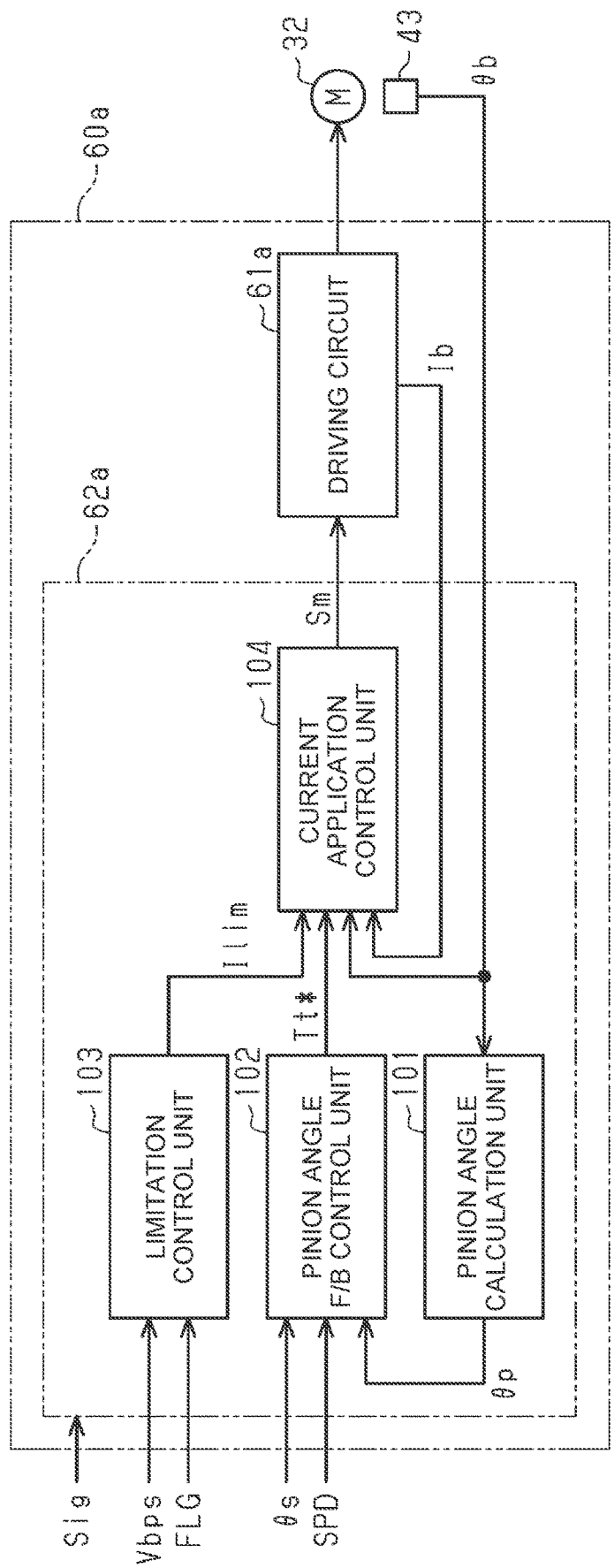
FIG. 6 is a block diagram showing a process executed by a turning-side control device of a steering control unit of FIG. 2.

FIG. 6 shows some of processes that the turning-side control device 60 executes through the control circuit 62a of the main control unit 60a. The processes shown in FIG. 6 are some of the processes realized as the CPU executes programs stored in the memory, and are depicted by the type of process to be realized. In this embodiment, the driving circuit 61a, the control circuit 62a, and the main control unit 60a including these circuits, i.e., the turning-side control device 60 is one example of the steering control device.

As shown in FIG. 6, a start signal Sig is input into the control circuit 62a. The start signal Sig is a signal indicating an on or off state of the start switch 47. The control circuit 62a determines the on or off state of the start switch 47 based on the start signal Sig. When the control circuit 62a determines that the start switch 47 is in the off state, the control circuit 62a disables control for operating the turning-side motor 32, i.e., puts the turning-side motor 32 in a shutdown state. When the start switch 47 is in the off state, the state of the turning unit 6 is a state of being unable to reflect the state of the steering unit 4.

When the control circuit 62a determines that the start switch 47 is in the on state, the control circuit 62a enables the control for operating the turning-side motor 32, i.e., puts the turning-side motor 32 in an execution state. When the start switch 47 is in the on state, the state of the turning unit 6 is a state of being able to reflect the state of the steering unit 4. Thus, the control circuit 62a executes turning-side control during current application for the steer-by-wire steering device 2. In this case, the control circuit 62a executes a process to be described below.

Turning-Side Control During Current Application

Other than the start signal Sig, the vehicle speed SPD, the rotation angle $\theta b$, a turning-side actual current value Ib, a steering angle $\theta s$, the output voltage Vbps, and the power supply state signal FLG are input into the control circuit 62a.

The turning-side actual current value Ib is information obtained from the driving circuit 61a. The driving circuit 61a has a current sensor (not shown). The current sensor detects the turning-side actual current value Ib that is obtained from a value of a current in each phase of the turning-side motor 32 flowing through a connection line between the driving circuit 61a and a motor coil in each phase of the turning-side motor 32. The current sensor acquires, as a current, a voltage drop of a shunt resistor that is connected to a source side of each switching element in an inverter included in the driving circuit 61a that is provided so as to correspond to the turning-side motor 32.

The steering angle $\theta s$ is information obtained from the steering-side control device 50 through the local network 70. The steering-side control device 50 converts the rotation angle $\theta a$ into an integrated angle including a range exceeding 360 degrees by, for example, counting the number of rotations of the steering-side motor 13 from a steering neutral position that is the position of the steering wheel 3 when the vehicle is moving straight ahead. The steering-side control device 50 calculates the steering angle $\theta s$ by multiplying the integrated angle, obtained by the conversion, by a conversion factor based on a rotation speed ratio of the steering-side speed reduction mechanism 14.

The output voltage Vbps is information obtained from the power source control unit 80. The control circuit 62a monitors the output voltage Vbps of the power source control unit 80 that changes according to the output voltage Vb of the main power source 45. The control circuit 62a detects the voltage of electricity supplied to the driving circuit 61a through the power supply line L11 as the output voltage Vbps of the power source control unit 80. The output voltage Vbps is a voltage detected at the connection point P14 of the power supply line L11.

The control circuit 62a controls driving of the driving circuit 61a based on the vehicle speed SPD, the rotation angle $\theta b$, the turning-side actual current value Tb, the steering angle $\theta s$, the output voltage Vbps, and the power supply state signal FLG. More specifically, the control circuit 62a has a pinion angle calculation unit 101, a pinion angle feedback control unit ("PINION ANGLE F/B CONTROL UNIT" in FIG. 6) 102, a limitation control unit 103, and a current application control unit 104.

The rotation angle $\theta b$ is input into the pinion angle calculation unit 101. The pinion angle calculation unit 101 converts the rotation angle $\theta b$ into an integrated angle including a range exceeding 360° by, for example, counting the number of rotations of the turning-side motor 32 from a rack neutral position that is the position of the rack shaft 22 when the vehicle is moving straight ahead. The pinion angle calculation unit 101 calculates a pinion angle $\theta p$ that is the actual rotation angle of the pinion shaft 21 by multiplying the integrated angle, obtained by the conversion, by a conversion factor based on a rotation speed ratio of the transmission mechanism 33, a lead of the conversion mechanism 34, and a rotation speed ratio of the rack-and-pinion mechanism 24. The pinion angle $\theta p$ thus obtained is output to the pinion angle feedback control unit 102. In some cases, the pinion angle $\theta p$ is output also to the steering-side control device 50.

The vehicle speed SPD, the steering angle θs, and the pinion angle θp are input into the pinion angle feedback control unit 102. The pinion angle feedback control unit 102 calculates a turning-side motor torque command value Tt* through feedback control of the pinion angle θp so as to adapt the pinion angle θp to a pinion target angle θp*. The pinion target angle θp* is calculated as an angle converted into the scale of the pinion angle θp with a steering angle ratio that is a ratio between the steering angle θs and the pinion angle θp taken into account relative to the steering angle θs. The steering angle ratio changes such that, for example, a change in the pinion angle θp relative to a change in the steering angle θs is greater when the vehicle speed SPD is low than when it is high. The turning-side motor torque command value Tt* thus obtained is output to the current application control unit 104.

The output voltage Vbps and the power supply state signal FLG are input into the limitation control unit 103. The limitation control unit 103 calculates an output limit value Ilim based on the output voltage Vbps and the power supply state signal FLG. The output limit value Ilim is a value for limiting an amount of current supplied to the turning-side motor 32. That is, the output limit value Ilim is a value for limiting the torque to be output by the turning-side motor 32. The output limit value Ilim is calculated so as to change according to the connection state of the driving circuit 61a to the main power source 45 and the auxiliary power source 81, i.e., the power supply state of the power source control unit 80. The output limit value Ilim thus obtained is output to the current application control unit 104.

The turning-side motor torque command value Tt*, the rotation angle θb, the turning-side actual current value Ib, and the output limit value Ilim are input into the current application control unit 104. The current application control unit 104 calculates a current command value Ib* for the turning-side motor 32 based on the turning-side motor torque command value Tt*. The current application control unit 104 executes a limitation process so as to limit the current command value Ib* based on the output limit value Ilim. The current application control unit 104 compares the current command value Ib* and the output limit value Ilim. When the absolute value of the current command value Ib* is a value exceeding the output limit value Ilim, the current application control unit 104 calculates, instead of the current command value Ib*, a value obtained by limiting the current command value Ib* to the output limit value Ilim as the final current command value Ib*. When the absolute value of the current command value Ib* is a value equal to or smaller than the output limit value Ilim, the current application control unit 104 calculates a value obtained by a calculation based on the turning-side motor torque command value Tt* as the final current command value Ib*.

The current application control unit 104 obtains a difference between the final current command value Ib* and a current value on a dq-coordinate system that is obtained by converting the turning-side actual current value Ib based on the rotation angle θb, and calculates a driving signal Sm for driving the driving circuit 61a so as to eliminate this difference. The driving signal Sm is a gate on-off signal that specifies an on or off state of each switching element of the inverter included in the driving circuit 61a. The driving signal Sm thus obtained is output to the driving circuit 61a. Driving power according to the driving signal Sm is supplied from the driving circuit 61a to the turning-side motor 32. As a result, the turning-side motor 32 rotates by an angle according to the turning-side motor torque command value Tt*.

Function of Limitation Control Unit

In the control circuit 62a, the limitation control unit 103 monitors state changes of the power source control unit 80 through detection of the output voltage Vbps. Thus, the limitation control unit 103 switches the output limit value Ilim according to state changes of the power source control unit 80. State changes of the power source control unit 80 are determined based on a detection result of the output voltage Vbps and a reception state of the power supply state signal FLG.

When the output voltage Vbps is equal to or lower than the output voltage V2 as represented by Expression (C) below, the limitation control unit 103 determines that the power supply state is not the normal state. When the limitation control unit 103 detects that the output voltage Vbps is higher than the output voltage V2, the limitation control unit 103 determines that the power supply state is not the backup state:

$$Vbps \leq V2 \quad (C)$$

In this embodiment, power supply states that are determined not to be the normal state include a transitioning-to-backup state in which, while it is determined that the voltage of the main power source 45 remains low, the power supply state is in the middle of switching from the normal state to the backup state. In the transitioning-to-backup state, the switches 83, 84, 85 are being switched to the backup state that is the connection state in which electricity is supplied from the auxiliary power source 81 to the driving circuit 61a. Further, power supply states that are determined not to be the backup state include a transitioning-to-normal state in which, while it is determined that the voltage decrease of the main power source 45 has been resolved, the power supply state is in the middle of switching from the backup state to the normal state. In the transitioning-to-normal state, the switches 83, 84, 85 are being switched to the normal state that is the connection state in which electricity is supplied from the main power source 45 to the driving circuit 61a.

More specifically, FIG. 7 shows state changes of the power source control unit 80 from a state where the output voltage Vbps is higher than the output voltage V2. The power supply state of the power source control unit 80 is the normal state. The power supply state signal FLGnm is transmitted through the signal line 90. Thus, the power supply state signal FLGbu has not been transmitted through the signal line 90 and therefore has not been received in the limitation control unit 103. The limitation control unit 103 calculates the output limit value Ilim that is a maximum value Imax. The maximum value Imax is a limit value of the torque that can be output by the turning-side motor 32, for example, a rated current value. Thus, the control circuit 62a executes turning-side control during current application without limitation in which the limitation control unit 103 allows a torque that can be output from the turning-side motor 32 to be up to the maximum value Imax that is the rated current value of the turning-side motor 32.

As shown in FIG. 7, when it is detected that the output voltage Vbps is higher than the output voltage V2, the limitation control unit 103 maintains the determination of the normal state. The limitation control unit 103 maintains the output limit value Ilim that is the maximum value Imax. Accordingly, the control circuit 62a maintains execution of the turning-side control during current application without limitation.

As shown in FIG. 7, when it is detected that the output voltage Vbps is equal to or lower than the output voltage V2, the limitation control unit 103 determines that the power supply state is not the normal state. At the same time, the limitation control unit 103 determines the reception state of the power supply state signal FLGbu.

When the limitation control unit 103 determines that the power supply state is not the normal state and that, moreover, the power supply state signal FLGbu has not been received, the limitation control unit 103 determines that the power supply state is the transitioning-to-backup state. The limitation control unit 103 calculates the output limit value Ilim that is a minimum value Imin. The minimum value Imin is, for example, a "0 (zero)" value taking into account that the auxiliary power source 81 cannot supply sufficient electricity to the turning-side motor 32. Accordingly, the control circuit 62a executes turning-side control during current application while the limitation control unit 103 sets an output-limited state in which the torque that can be output from the turning-side motor 32 is limited to the minimum value Imin that is "0."

On the other hand, when the limitation control unit 103 determines that the power supply state is not the normal state and that, moreover, the power supply state signal FLGbu has been received, the limitation control unit 103 determines that the power supply state is the backup state. That is, the limitation control unit 103 determines that switching to the backup state has been completed. The limitation control unit 103 calculates the output limit value Ilim that is a backup-state limit value Ibu. The backup-state limit value Ibu is a value larger than the minimum value Imin and not larger than the maximum value Imax from the viewpoint of electricity that the auxiliary power source 81 can supply to the turning-side motor 32. Accordingly, the control circuit 62a executes turning-side control during current application while the limitation control unit 103 sets an output-limited state in which the torque that can be output from the turning-side motor 32 is limited to the backup-state limit value Ibu. As the backup-state limit value Ibu, an appropriate value is calculated with the state of the steering device 2 taken into account. Examples of the state of the steering device 2 include an internal temperature of the steering control unit 1, an operating state of the turning-side motor 32, and remaining electricity of the auxiliary power source 81.

FIG. 8 shows state changes of the power source control unit 80 from a state where the output voltage Vbps is equal to or lower than the output voltage V2. The power supply state of the power source control unit 80 is the backup state. The power supply state signal FLGbu is transmitted through the signal line 90. Thus, the power supply state signal FLGnm has not been transmitted through the signal line 90 and therefore has not been received in the limitation control unit 103. The limitation control unit 103 calculates the output limit value Ilim that is the backup-state limit value Ibu. Accordingly, the control circuit 62a executes the turning-side control during current application while the output-limited state is set.

As shown in FIG. 8, when it is detected that the output voltage Vbps is equal to or lower than the output voltage V2, the limitation control unit 103 maintains the determination of the backup state. The limitation control unit 103 maintains the output limit value Ilim that is the backup-state limit value Ibu. Accordingly, the control circuit 62a maintains execution of the turning-side control during current application while the output-limited state is set.

As shown in FIG. 8, when it is detected that the output voltage Vbps is higher than the output voltage V2, the limitation control unit 103 determines that the power supply state is not the backup state. At the same time, the limitation control unit 103 determines the reception state of the power supply state signal FLGnm.

When the limitation control unit 103 determines that the power supply state is not the backup state and that, moreover, the power supply state signal FLGnm has not been received, the limitation control unit 103 determines that the power supply state is the transitioning-to-normal state. The limitation control unit 103 maintains the output limit value Ilim that is the backup-state limit value Ibu. Accordingly, the control circuit 62a executes the turning-side control during current application while the output-limited state is set.

On the other hand, when the limitation control unit 103 determines that the power supply state is not the backup state and that, moreover, the power supply state signal FLGnm has been received, the limitation control unit 103 determines that the power supply state has recovered from the backup state. That is, the limitation control unit 103 determines that switching to the normal state has been completed. The limitation control unit 103 calculates the output limit value Ilim that is the maximum value Imax. Accordingly, the control circuit 62a cancels the output-limited state and thus executes the turning-side control during current application without limitation.

When the control circuit 62a sets the output-limited state through processing by the limitation control unit 103, the control circuit 62a outputs a warning signal BE. The control circuit 62a transmits the warning signal BE to other control devices on the vehicle side through an on-board network, such as a CAN. On the other hand, when the control circuit 62a cancels the output-limited state through processing by the limitation control unit 103, the control circuit 62a stops outputting the warning signal BE. Examples of the other control devices on the vehicle side include a device that controls a driving system involved in travel of the vehicle and a device that controls a brake system involved in braking of the vehicle. The warning signal BE is information indicating that the output-limited state is set. While the output-limited state is set, the control circuit 62a continuously outputs the warning signal BE. The warning signal BE thus transmitted is received by the other control devices on the vehicle side. Upon receiving the warning signal BE, the other control devices on the vehicle side control operation of notifying that the output-limited state is set. Examples of this notification operation include operation of a display device that notifies information by appealing to the driver's visual sense, a warning device that notifies information by appealing to the driver's auditory sense, and a physical sensation generation device that notifies information to the driver through physical sensation.

Output Limit Value

The power supply state signal FLGbu starts to be received by the limitation control unit 103 at an input timing that is slightly behind a timing when the limitation control unit 103 starts to determine that the power supply state is the transitioning-to-backup state. Similarly, the power supply state signal FLGnm starts to be received by the limitation control unit 103 at an input timing that is slightly behind a timing when the limitation control unit 103 starts to determine that the power supply state is the transitioning-to-normal state.

Communication through the dedicated signal line 90 requires a communication time attributable to the route or the communication cycle of the line. In this relation, it takes a communication time based on the communication cycle etc. before the power supply state signal FLG starts to be received by the limitation control unit 103 after being transmitted to the signal line 90. The power source control device 88 requires multiple arithmetic operation cycles to complete switching of the switches 83, 84, 85 upon determining that a voltage decrease has occurred or that the backup state is to be canceled. In this relation, it takes a processing time based on multiple arithmetic operation cycles (e.g., "about a few tens of milliseconds") before the power supply state signal FLG indicating the connection state upon completion of switching of the switches 83, 84, 85 starts to be transmitted after it is determined that a voltage decrease has occurred or that the backup state is to be canceled. The start of switching of the switches 83, 84, 85 nearly matches the timing at which the power source control device 88 determines that a voltage decrease has occurred or that the backup state is to be canceled. The timing at which the power source control device 88 determines that a voltage decrease has occurred or that the backup state is to be canceled nearly matches the timing at which the limitation control unit 103 starts to determine that the power supply state is the transitioning-to-backup state or the transitioning-to-normal state.

Thus, the input timing of the power supply state signal FLGbu is behind the timing at which the limitation control unit 103 starts to determine that the power supply state is the transitioning-to-backup state by a total time of the "communication time" and the "processing time." Similarly, the input timing of the power supply state signal FLGbu is behind the timing at which the limitation control unit 103 starts to determine that the power supply state is the transitioning-to-normal state by a delay time corresponding to a total of the "processing time" and the "communication time."

As shown in FIG. 7, even when the limitation control unit 103 detects that the output voltage Vbps is equal to or lower than the output voltage V2, the limitation control unit 103 does not immediately determine that the power supply state is the backup state. Instead, when the limitation control unit 103 detects that the output voltage Vbps is equal to or lower than the output voltage V2, the limitation control unit 103 temporarily determines that the power supply state is the transitioning-to-backup state. The time of thus determining that the power supply state is the transitioning-to-backup state corresponds to the aforementioned delay time. Thus, when the limitation control unit 103 detects that the output voltage Vbps is equal to or lower than the output voltage V2, the limitation control unit 103 can immediately calculate the output limit value Ilim that is the minimum value Imin. That is, the limitation control unit 103 is configured such that, when it is detected that the output voltage Vbps is equal to or lower than the output voltage V2, the limitation control unit 103 does not calculate the output limit value Ilim that is the maximum value Imax or the backup-state limit value Ibu unless switching to the backup state is completed.

As shown in FIG. 8, even when the limitation control unit 103 detects that the output voltage Vbps is higher than the output voltage V2, the limitation control unit 103 does not immediately determine that the power supply state has recovered from the abnormality. Instead, when the limitation control unit 103 detects that the output voltage Vbps is higher than the output voltage V2, the limitation control unit 103 temporarily determines that the power supply state is the transitioning-to-normal state. The time of thus determining that the power supply state is the transitioning-to-normal state corresponds to the aforementioned delay time. Thus, even when the limitation control unit 103 detects that the output voltage Vbps is higher than the output voltage V2, the limitation control unit 103 can temporarily maintain the output limit value Ilim that is the backup-state limit value Ibu. That is, the limitation control unit 103 is configured such that, even when it is detected that the output voltage Vbps is higher than the output voltage V2, the limitation control unit 103 does not calculate the output limit value Ilim that is the maximum value Imax unless switching for restoration to the normal state is completed.

Unless the main power source 45 fails, the sub control unit 60b executes turning-side control during current application through processing by the control circuit 62b, similar to that by the control circuit 62a. When the main power source 45 fails and the output voltage Vb decreases to below the voltage threshold value Vth, the sub control unit 60b stops the turning-side control during current application. This is because the sub control unit 60b is not connected to the auxiliary power source 81.

The steering-side control device 50 may have a main control unit 50a configured to include a limitation control unit similar to that of the main control unit 60a, or may have a main control unit 50a configured not to include this limitation control unit. In the case where the main control unit 50a is configured to include a limitation control unit similar to that of the main control unit 60a, the main control unit 50a can execute steering-side control during current application through processing by the limitation control unit similar to that of the main control unit 60a. As with the main control unit 50a, the sub control unit 50b executes steering-side control during current application unless the main power source 45 fails. When the main power source 45 fails and the output voltage Vb decreases to below the voltage threshold value Vth, the sub control unit 50b stops the turning-side control during current application. This is because the sub control unit 50b is not connected to the auxiliary power source 81.

Workings of this Embodiment

Figure 9:
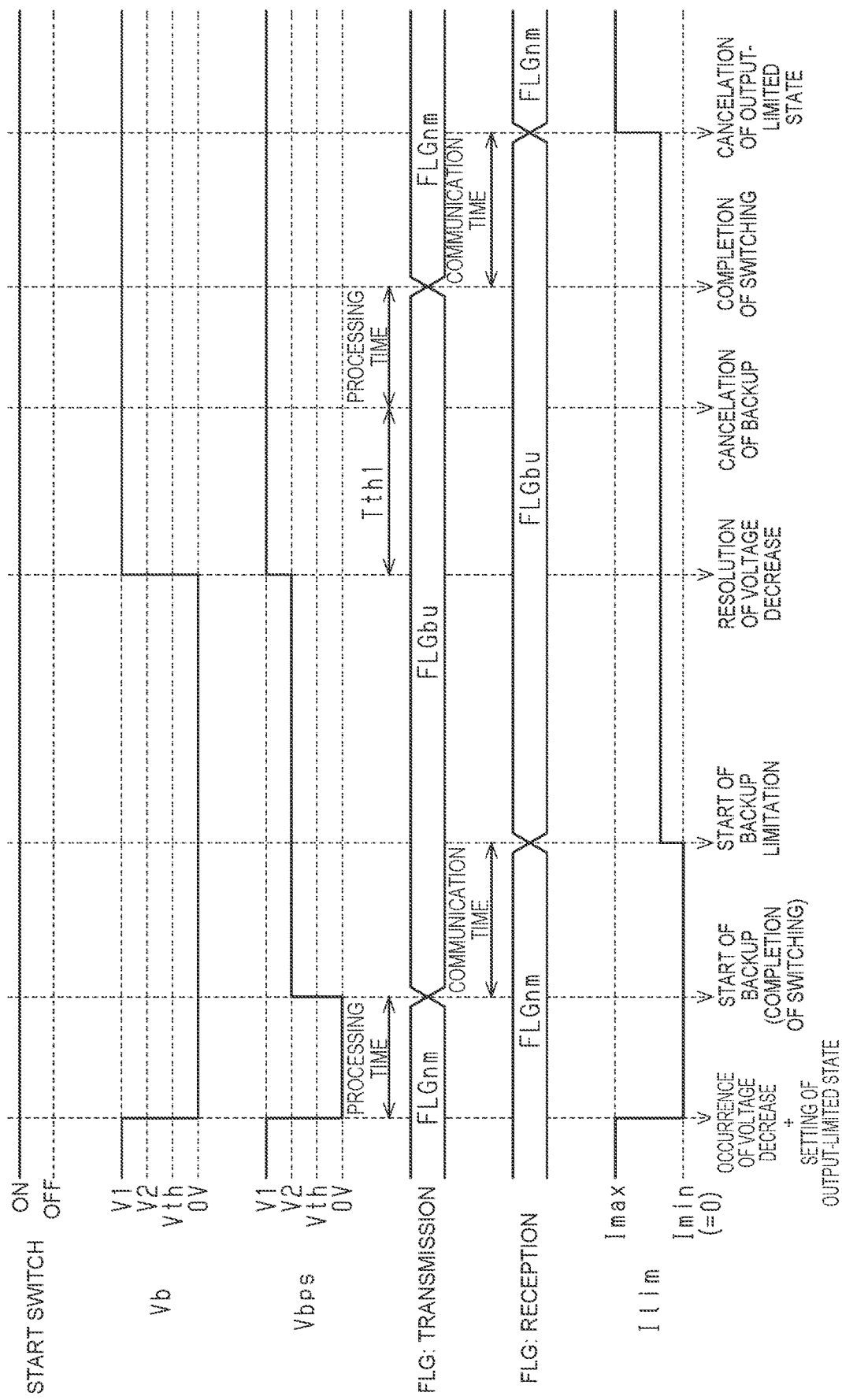
FIG. 9 is a chart showing, in relation to the first embodiment, a state of a start switch, an output voltage of a main power source, an output voltage of the power source control unit, a communication state of a power supply state signal, a reception state of the power supply state signal, and an output limit value.

For example, FIG. 9 shows changes over time in the detection result of the output voltage Vb and the detection result of the output voltage Vbps when the start switch 47 is in the on state. The output voltage Vb is a detection result of the power source control device 88. The output voltage Vbps is a detection result of the control circuit 62a. When the start switch 47 is in the on state, unless the main power source 45 has failed, the output voltage V1 is detected as the output voltage Vb and the output voltage Vbps.

In this case, as shown in FIG. 9, as the transmission state of the power supply state signal FLG, the power supply state signal FLGnm is being continuously transmitted. This is because the power source control device 88 determines the main power source 45 to be normal and accordingly outputs the power supply state signal FLGnm. For the same reason, as shown in FIG. 9, as the reception state of the power supply state signal FLG, the power supply state signal FLGnm is being continuously received.

As shown in FIG. 9, the output limit value Ilim is the maximum value Imax. This is because the limitation control unit 103 determines that the power supply state is the normal state. Subsequently, as shown in FIG. 9, after the main power source 45 fails, the output voltage Vb and the output voltage Vbps decrease further, so that both voltages fall below the voltage threshold value Vth and decrease to, for example, "0 (zero)" ("OCCURRENCE OF VOLTAGE DECREASE" in FIG. 9). When the output voltage Vb falls below the voltage threshold value Vth, the power source control device 88 starts to switch the switches 83, 84, 85 to the backup state.

In this case, as shown in FIG. 9, as the transmission state of the power supply state signal FLG, the power supply state signal FLGbu starts to be transmitted with a delay ("PROCESSING TIME" in FIG. 9) from "OCCURRENCE OF VOLTAGE DECREASE." This is because it takes a time of "about a few tens of milliseconds" for the power source control device 88 to start to switch the switches 83, 84, 85 to the backup state and complete the switching ("START OF BACKUP" in FIG. 9). As shown in FIG. 9, as the reception state of the power supply state signal FLG, the power supply state signal FLGbu starts to be received with a further delay ("COMMUNICATION TIME" in FIG. 9) from "START OF BACKUP" due to a delay based on the communication cycle etc. in addition to the aforementioned reason.

As shown in FIG. 9, the output limit value Ilim is the minimum value Imin during the period from "OCCURRENCE OF VOLTAGE DECREASE" until the power supply state signal FLGbu starts to be received ("SETTING OF OUTPUT-LIMITED STATE" in FIG. 9). This is because, during the period from "OCCURRENCE OF VOLTAGE DECREASE" until the power supply state signal FLGbu starts to be received, the limitation control unit 103 determines that the power supply state is the transitioning-to-backup state.

As shown in FIG. 9, after the power supply state signal FLGbu starts to be received, the output limit value Ilim is the backup-state limit value Ibu. This is because, as the power supply state signal FLGbu starts to be received, the limitation control unit 103 determines that the power supply state is the backup state ("START OF BACKUP LIMITATION" in FIG. 9).

Subsequently, as shown in FIG. 9, when the main power source 45 recovers from the failure, the output voltage Vb and the output voltage Vbps each reach the voltage threshold value Vth or higher ("RESOLUTION OF VOLTAGE DECREASE" in FIG. 9). When the output voltage Vb equal to or higher than the voltage threshold value Vth is maintained for the time threshold value Tth1, the power source control device 88 starts to switch the switches 83, 84, 85 to the normal state ("CANCELATION OF BACKUP" in FIG. 9).

In this case, as shown in FIG. 9, as the transmission state of the power supply state signal FLG, the power supply state signal FLGnm starts to be transmitted with a delay ("PROCESSING TIME" in FIG. 9) from "CANCELATION OF BACKUP." This is because it take a time of "about a few tens of milliseconds" for the power source control device 88 to start to switch the switches 83, 84, 85 to the normal state ("CANCELATION OF BACKUP" in FIG. 9) and complete the switching. As shown in FIG. 9, as the reception state of the power supply state signal FLG, the power supply state signal FLGnm starts to be received with a further delay ("COMMUNICATION TIME" in FIG. 9) from "CANCELATION OF BACKUP" due to a delay based on the communication cycle etc. in addition to the aforementioned reason.

As shown in FIG. 9, the output limit value Ilim is the backup-state limit value Ibu during the period from "RESOLUTION OF VOLTAGE DECREASE" until the power supply state signal FLGnm starts to be received. This is because, during the period from "RESOLUTION OF VOLTAGE DECREASE" until the power supply state signal FLGnm starts to be received, the limitation control unit 103 determines that the power supply state is the transitioning-to-normal state.

As shown in FIG. 9, after the power supply state signal FLGnm starts to be received, the output limit value Ilim is the maximum value Imax. This is because, as the power supply state signal FLGnm starts to be received, the limitation control unit 103 determines that the power supply state is the normal state ("CANCELATION OF OUTPUT-LIMITED STATE" in FIG. 9).

According to this embodiment, when the power source control device 88 determines that a voltage decrease of the main power source 45 has been resolved in the backup state, the power source control device 88 can restore the power supply state to the original state by completing switching of the connection state from the backup state to the normal state. In this case, after the power supply state is restored to the original state, the control circuit 62a cancels the output-limited state by calculating the output limit value Ilim that is the maximum value Imax.

Advantages of Embodiment 1-1

Even when it is determined that a voltage decrease of the main power source 45 has been resolved, the output-limited state is continued unless restoration of the power supply state to the original state is completed. This helps prevent a situation where the output-limited state is canceled before restoration of the power supply state to the original state is completed.

1-2

In a situation of determining whether a voltage decrease of the main power source 45 has been resolved, the power source control device 88 can determine that the main power source 45 has recovered from the voltage decrease on the condition that resolution of the voltage decrease is not a momentary event but is maintained for some time. Thus, even when the voltage decrease of the main power source 45 has been resolved, if it is a momentary event, it is not determined that the main power source 45 has recovered from the voltage decrease. This can increase the accuracy of determining whether the main power source 45 has recovered from the voltage decrease after determining that the voltage decrease of the main power source 45 has occurred.

1-3

The power source control device 88 determines whether the main power source 45 has recovered from a voltage decrease based on the output voltage Vb and the determination time Tst. Thus, parameters required to determine whether the main power source 45 has recovered from a voltage decrease can be simplified. This is effective in easily realizing a process relating to determination of whether the main power source 45 has recovered from a voltage decrease.

1-4

After the power source control device 88 determines that a voltage decrease of the main power source 45 has occurred, the power source control device 88 executes the process for determining whether the voltage decrease has been resolved only during the limit time Tth2. Thus, consumption of electricity required for the process of determining whether a voltage decrease has been resolved after determining that a voltage decrease of the main power source 45 has occurred can be reduced. This is effective in reducing the electricity consumption of the auxiliary power source 81 in the case where the capacity of the auxiliary power source 81 is limited as in this embodiment.

1-5

The control circuit 62a can determine the power supply state based on information acquired from the power source control device 88 through the signal line 90. Thus, the control circuit 62a can operate with the power supply state of the power source control unit 80 taken into account.

1-6

In this embodiment, a situation where the power source performance of the auxiliary power source 81 is exceeded in the backup state is less likely to arise. Thus, even when it is determined that a voltage decrease of the main power source 45 has occurred, operation of the turning-side motor 32 can be appropriately continued. This is effective particularly when the power source performance of the auxiliary power source 81 is low compared with that of the main power source 45.

Second Embodiment

Next, a vehicle power supply system according to a second embodiment will be described. For the convenience of description, the same components as in the above-described first embodiment will be denoted by the same reference signs as in the first embodiment and the description thereof will be omitted.

After determining that a voltage decrease of the main power source 45 has occurred, the power source control device 88 according to this embodiment executes a process for determining whether the voltage decrease of the main power source 45 has been resolved, regardless of the elapsed time. That is, after it is determined that a voltage decrease of the main power source 45 has occurred, determination as to whether the voltage decrease of the main power source 45 has been resolved is continuously executed unless it is determined that the voltage decrease of the main power source 45 has been resolved. Thus, after determining that a voltage decrease of the main power source 45 has occurred, even when the elapsed time Ter of the above-described first embodiment has exceeded the time limit Tth2, the power source control device 88 can determine whether the voltage decrease of the main power source 45 has been resolved.

Advantages of this Embodiment

According to the second embodiment having been described above, workings equivalent to those of the above-described first embodiment can be achieved, as well as advantages equivalent to (1-1) to (1-3), (1-5), and (1-6) of the first embodiment can be achieved. In addition, according to the second embodiment, an advantage described below can be further achieved.

2-1

After it is determined that a voltage decrease of the main power source 45 has occurred, determination as to whether the voltage decrease of the main power source 45 has been resolved is continuously executed unless it is determined that the voltage decrease of the main power source 45 has been resolved. This can increase opportunities for the main power source 45 to recover from the voltage decrease. This is effective in sustaining the operation of the turning-side motor 32 as much as possible.

Other Embodiments

Each of the above-described embodiments may be changed as follows. The following other embodiments can be combined with one another within such a range that no technical inconsistency arises.

In each of the above-described embodiments, the diodes 86, 87 may form an OR circuit inside the turning-side control device 60, i.e., the steering control unit 1. Also in this case, electricity that is selected from electricity of the main power source 45 and electricity of the auxiliary power source 81 as having a higher supply voltage is supplied to the turning-side control device 60.

In each of the above-described embodiments, the power source performance of the auxiliary power source 81 may be performance equivalent to that of the main power source 45, or may be higher than that of the main power source 45. For example, the power source capacity of the auxiliary power source 81 may be equivalent to that of the main power source 45, or may be set to be higher than that of the main power source 45. For example, the output voltage V2 of the auxiliary power source 81 may be set to a value equivalent to the output voltage V1 of the main power source 45, or may be set to be higher than the output voltage V1 of the main power source 45.

In each of the above-described embodiments, as the auxiliary power source 81, an electric double-layer capacitor or a secondary battery may be adopted. In each of the above-described embodiments, in addition to backing up power supply by the main power source 45, the power source control unit 80 may be able to supply electricity of the main power source 45 after raising the voltage thereof.

In each of the above-described embodiments, the configuration relating to the power supply state signal FLG may be omitted. For example, the limitation control unit 103 may determine that the power supply state is the backup state when a time has elapsed in which the power source control device 88 is expected to complete switching of the switches 83, 84, 85 to the backup state after determining that a voltage decrease of the main power source 45 has occurred. The limitation control unit 103 may determine that the power supply state is the backup state when an output voltage Vbps equal to or higher than the voltage threshold value Vth is detected.

In each of the above-described embodiments, the time threshold value Tth1 may be variable with a system state, such as electricity consumption of the steering device 2, taken into account. In each of the above-described embodiments, when determining whether a voltage decrease of the main power source 45 has been resolved, the power source control device 88 can also determine the operating state, such as the amount of electricity generated by the power generator 46, instead of the state in which detection of the output voltage Vb equal to or higher than the voltage threshold value Vth is maintained. The operating state of the power generator 46 can be obtained from another control device on the vehicle side. The operating state of the power generator 46 is a state parameter indicating a state where resolution of the voltage decrease of the main power source 45 can be maintained.

In each of the above-described embodiments, when determining that a voltage decrease of the main power source 45 has been resolved, the power source control device 88 may immediately determine that the main power source 45 has recovered from the voltage decrease, i.e., that the backup state should be canceled.

In each of the above-described embodiments, the limitation control unit 103 can monitor state changes of the power source control unit 80 also by detecting the output voltage Vb instead of detecting the output voltage Vbps. In this case, the limitation control unit 103 should also determine the reception state of the power supply state signal FLG.

In each of the above-described embodiments, the control devices 50, 60 may be each formed by a single system of the main control unit 50a or 60a. In this case, for example, the main control unit 60*a* should have the same function as in each of the above-described embodiments.

In each of the above-described embodiments, the sub control units 50*b*, 60*b* in the control devices 50, 60 may be connected to the main power source 45 through the power source control unit 80. In each of the above-described embodiments, the limitation control unit 103 can also change the output limit value Ilim so as to make the output limit value Ilim change gradually. This may be adopted only in the case where the output limit value Ilim becomes larger as a result of the change. Thus, the influence that the change in the output limit value Ilim exerts on the vehicle's behavior can be mitigated to secure the comfort of occupants in the vehicle.

In each of the above-described embodiments, the limitation control unit 103 may calculate the output limit value Ilim by selecting one from a plurality of candidate values corresponding to causes other than occurrence of a voltage decrease of the main power source 45. For example, the limitation control unit 103 may calculate the output limit value Ilim by selecting a minimum value among the plurality of candidate values.

In each of the above-described embodiments, the power source control unit 80 may include a power source control unit for the steering unit and a power source control unit for the turning unit. For example, the power source control unit for the steering unit should be connected only to the steering unit 4 including the steering-side control device 50. The power source control unit for the turning unit should be connected only to the turning unit 6 including the turning-side control device 60.

In each of the above-described embodiments, the control devices 50, 60 may constitute a single control device having functions integrating the function of operating the steering-side motor 13 and the function of operating the turning-side motor 32.

In each of the above-described embodiments, the operation member that the driver operates to steer the vehicle is not limited to the steering wheel 3. For example, the operation member may be a joystick. In each of the above-described embodiments, the steering-side motor 13 that is mechanically coupled to the steering wheel 3 is not limited to a three-phase brushless motor. For example, the steering-side motor 13 may be a direct-current motor with a brush.

In each of the above-described embodiments, the turning unit 6 transmits rotation of the turning-side motor 32 to the conversion mechanism 34 through the transmission mechanism 33. Without being limited thereto, the turning unit 6 may be configured to transmit rotation of the turning-side motor 32 to the conversion mechanism 34 through a gear mechanism. The turning unit 6 may be configured such that the turning-side motor 32 directly rotates the conversion mechanism 34. Further, the turning unit 6 may have a configuration including a second rack-and-pinion mechanism, and the turning unit 6 may be configured so as to convert rotation of the turning-side motor 32 into reciprocating motion of the rack shaft 22 by this second rack-and-pinion mechanism.

In each of the above-described embodiments, the turning unit 6 is not limited to the configuration in which the right turning wheel 5 and the left turning wheel 5 turn in conjunction with each other. In other words, the turning unit 6 may be configured to be able to independently control the right turning wheel 5 and the left turning wheel 5.

In each of the above-described embodiments, the steering device 2 has a link-less structure in which the steering unit 4 and the turning unit 6 are always mechanically cut off from each other. Without being limited thereto, the steering device 2 may have a structure in which the steering unit 4 and the turning unit 6 can be mechanically cut off from each other by, for example, a clutch. The steering device 2 is not limited to a steer-by-wire steering device but may be an electric power steering device that applies a torque of a motor to the steering shaft 11 or the rack shaft 22.

What is claimed is:

1. A vehicle power supply system for a vehicle equipped with a first power source and a steering device having a motor, the vehicle power supply system comprising:
   a power source control unit having a second power source; and
   a steering control unit that is connected to the first power source through the power source control unit and that controls the steering device, wherein:
   the steering control unit includes a steering control microcomputer configured to control operation of the motor, the steering control microcomputer including a driving circuit that drives so as to supply the motor with electricity that is supplied as the driving circuit is connected to at least one of the first power source and the second power source, the steering control microcomputer being configured to control operation of the motor by controlling driving of the driving circuit;
   the power source control unit includes a power source control microcomputer that switches a connection state of the driving circuit between (i) a first state in which electricity is supplied from the first power source to the driving circuit, and (ii) a second state in which electricity is supplied from the second power source to the driving circuit, the power source control microcomputer being configured to execute (a) a state detection process of detecting a state change of the first power source and (b) a switching process of switching the connection state;
   the switching process includes:
   a first switching process of switching the connection state to transition from the first state to the second state when an abnormality of the first power source is detected through the state detection process; and
   a second switching process of, when having previously transitioned to the second state as a result of the abnormality of the first power source having been detected, switching the connection state to transition from the second state to the first state when recovery of the first power source from the abnormality is detected through the state detection process;
   the steering control microcomputer is configured to, after the abnormality of the first power source has been detected, set an output-limited state for limiting a torque that the motor is able to output compared with the torque before the abnormality was detected;
   the steering control microcomputer is configured to cancel the output-limited state upon completion of the second switching process;
   the state detection process includes:
   an abnormality condition determination process of determining that an abnormality condition of the first power source exists when an output voltage of the first power source is less than a voltage threshold value;
   an abnormality resolution condition determination process of determining, after determining that the abnormality condition exists, whether an abnormality resolution condition is met, the abnormality resolution condition being met when the abnormality condition no longer exists; and a recovery condition determination process of determining, after the abnormality resolution condition has been met, whether a recovery condition indicating that the first power source has recovered from the abnormality exists, the recovery condition being that an elapsed time from when the abnormality resolution condition has been met is equal to or greater than a time threshold value; and the power source control microcomputer is configured (1) to execute the abnormality resolution condition determination process during a period between a time at which the abnormality condition has been determined to exist until a time limit elapses without the recovery condition being determined to exist, and (2) to not execute the abnormality resolution condition determination process after the time limit elapses.

2. The vehicle power supply system according to claim 1, wherein:

the power source control microcomputer and the steering control microcomputer are communicably connected to each other through a line;

through the line, the power source control microcomputer outputs to the steering control microcomputer switching completion information indicating that switching of the connection state has been completed in a case where the connection state transitions to the first state or the second state; and the steering control microcomputer is configured to recognize that switching of the connection state by the power source control microcomputer has been completed based on the switching completion information acquired from the power source control microcomputer through the line.

3. The vehicle power supply system according to claim 1, wherein:

the output-limited state is a state in which the torque to be output by the motor is limited so as not to exceed an output limit value; and when power source performance of the second power source defined by a power source capacity or an output voltage is low compared with power source performance of the first power source, the output limit value is a value lower than a limit of the power source performance of the second power source.

4. A control method of a vehicle power supply system for a vehicle equipped with a first power, source and a steering device having a motor, the vehicle power supply system including a power source control unit having a second power source and a power source control microcomputer, and a steering control unit that is connected to the first power source through the power source control unit and that controls the steering device, the steering control unit including a steering control microcomputer, the steering control microcomputer including a driving circuit, the control method comprising:

by the driving circuit, supplying the motor with electricity that is supplied as the driving circuit is connected to at least one of the first power source and the second power source;

by the steering control microcomputer, controlling operation of the motor by controlling driving of the driving circuit;

by the power source control microcomputer, executing following processes:

executing a state detection process of detecting a state change of the first power source; and executing a switching process of switching a connection state of the driving circuit between (i) a first state in which electricity is supplied from the first power source to the driving circuit, and (ii) a second state in which electricity is supplied from the second power source to the driving circuit;

the switching process including:

a first switching process of switching the connection state to transition from the first state to the second state in response to an abnormality of the first power source being detected through the state detection process; and a second switching process of, when having previously transitioned to the second state as a result of the abnormality of the first power source having been detected, switching the connection state to transition from the second state to the first state in response to recovery of the first power source from the abnormality being detected through the state detection process;

by the steering control microcomputer, after the abnormality of the first power source has been detected, setting an output-limited state for limiting a torque that the motor is able to output compared with the torque before the abnormality was detected;

by the steering control microcomputer, canceling the output-limited state upon completion of the second switching process;

the state detection process including:

an abnormality condition determination process of determining that an abnormality condition of the first power source exists in response to an output voltage of the first power source being less than a voltage threshold value;

an abnormality resolution condition determination process of determining, after determining that the abnormality condition exists, whether an abnormality resolution condition is met, the abnormality resolution condition being met when the abnormality condition no longer exists; and a recovery condition determination process of determining, in response to the abnormality resolution condition being met, whether a recovery condition indicating that the first power source has recovered from the abnormality exists, the recovery condition being that an elapsed time from when the abnormality resolution condition has been met is equal to or greater than a time threshold value;

by the power source control microcomputer: (1) executing the abnormality resolution condition determination process during a period between a time at which the abnormality condition has been determined to exist until a time limit elapses without the recovery condition being determined to exist, and (2) not executing the abnormality resolution condition determination process after the time limit elapses.

* * * * *